US012691407B2

(12) United States Patent
Zhang et al.

(10) Patent No.: US 12,691,407 B2
(45) Date of Patent: Jul. 28, 2026

(54) METHOD FOR THE VOLATILE ORGANIC COMPOUNDS ADSORPTION CAPACITY PREDICTION BASED ON FILLING ADSORPTION

(71) Applicant: UNIVERSITY OF CHINESE ACADEMY OF SCIENCES, Beijing (CN)

(72) Inventors: Zhongshen Zhang, Beijing (CN); Zhengping Hao, Beijing (CN); Wenqing Wu, Beijing (CN); Ganggang Li, Beijing (CN); Wenpeng Li, Beijing (CN); Xinxin Wang, Beijing (CN); Jie Cheng, Beijing (CN)

(73) Assignee: UNIVERSITY OF CHINESE ACADEMY OF SCIENCES (CN)

( * ) Notice: Subject to any disclaimer, the term of this patent is extended or adjusted under 35 U.S.C. 154(b) by 310 days.

(21) Appl. No.: 18/663,113

(22) Filed: May 14, 2024

(65) Prior Publication Data

US 2024/0390844 A1 Nov. 28, 2024

(30) Foreign Application Priority Data

May 26, 2023 (CN) .......................... 202310610575.4

(51) Int. Cl.
*B01D 53/30* (2006.01)
*B01D 53/04* (2006.01)
(52) U.S. Cl.
CPC ......... *B01D 53/30* (2013.01); *B01D 53/0454* (2013.01); *B01D 2253/106* (2013.01); *B01D 2257/708* (2013.01)

(58) Field of Classification Search
CPC ................ B01D 53/30; B01D 53/0454; B01D 2253/106; B01D 2257/708; Y02A 50/20;
(Continued)

(56) References Cited

U.S. PATENT DOCUMENTS 4,014,817 A * 3/1977 Johnson ................ C01B 32/336
502/426
10,147,950 B2 * 12/2018 Sakshaug .............. H01M 4/587
(Continued)

FOREIGN PATENT DOCUMENTS

CN 112435717 * 3/2021

OTHER PUBLICATIONS

Epo translation of CN112435717 (Year: 2021).*

*Primary Examiner* — Stephen Hobson

(57) ABSTRACT

The invention presents a method for predicting volatile organic compounds (VOCs) adsorption capacity via filling adsorption, in the domain of exhaust gas treatment. Utilizing two or more porous materials with concentrated pore size distributions as model adsorption materials, it identifies the critical pore size for filling adsorption under specific conditions. Filling adsorption operates via volume filling, linking adsorption capacity to density and pore volume. Conversely, non-filling adsorption relies on surface covering mechanisms, correlating adsorption capacity with specific surface area. By establishing a linear equation using pore volume and specific surface area, solved with known model material parameters, it accommodates pore size variation and pressure influence on adsorption capacity. This equation predicts VOCs adsorption capacity and isotherms based on the adsorption material's pore structure.

9 Claims, 13 Drawing Sheets

(58) Field of Classification Search
CPC ................. G01N 15/08; G01N 15/088; G01N
2015/0866; G06F 17/11
See application file for complete search history.

(56) References Cited

U.S. PATENT DOCUMENTS

| | | | | |
|---|---|---|---|---|
| 10,195,583 | B2 * | 2/2019 | Costantino | B01J 20/20 |
| 10,287,170 | B2 * | 5/2019 | Feaver | H01M 10/052 |
| 10,522,836 | B2 * | 12/2019 | Thompkins | C08K 3/08 |
| 10,688,467 | B2 * | 6/2020 | Holbrook | B01J 20/20 |
| 11,644,153 | B2 * | 5/2023 | Wang | B01J 20/28011 |
| | | | | 62/46.3 |
| 12,385,818 | B2 * | 8/2025 | Abdelrahman | G01V 20/00 |
| 2005/0202969 | A1 * | 9/2005 | Kondo | B01J 20/3078 |
| | | | | 502/416 |
| 2008/0207442 | A1 * | 8/2008 | Pfeifer | H01G 11/34 |
| | | | | 423/445 R |
| 2009/0273106 | A1 * | 11/2009 | Lin | C04B 38/045 |
| | | | | 264/308 |
| 2009/0301902 | A1 * | 12/2009 | Gogotsi | B01J 20/2808 |
| | | | | 423/445 R |
| 2011/0048063 | A1 * | 3/2011 | Carruthers | B01J 20/3078 |
| | | | | 502/402 |
| 2011/0052486 | A1 * | 3/2011 | Ito | C01B 3/0084 |
| | | | | 502/430 |
| 2012/0234695 | A1 * | 9/2012 | Mayes | C02F 1/4691 |
| | | | | 204/252 |
| 2013/0216472 | A1 * | 8/2013 | Han | C08F 120/56 |
| | | | | 502/402 |
| 2014/0038816 | A1 * | 2/2014 | Bakker | C01G 51/04 |
| | | | | 502/345 |
| 2014/0113811 | A1 * | 4/2014 | Stadie | C10L 3/06 |
| | | | | 423/292 |
| 2014/0120339 | A1 * | 5/2014 | Nikova | B01J 20/20 |
| | | | | 428/221 |
| 2015/0329364 | A1 * | 11/2015 | Dong | C01B 32/348 |
| | | | | 423/460 |
| 2016/0031713 | A1 * | 2/2016 | Fish | B01J 20/20 |
| | | | | 423/460 |

* cited by examiner $$Q = a \times \rho \times V_c + b \times S_c$$

$$V_c = V_1 + V_2 + \ldots + V_n \qquad S_c = S_1 + S_2 + \ldots + S_n$$

METHOD FOR THE VOLATILE ORGANIC COMPOUNDS ADSORPTION CAPACITY PREDICTION BASED ON FILLING ADSORPTION

TECHNICAL FIELD

The present invention relates to the technical field of exhaust gas treatment, in particular to a method for the volatile organic compounds adsorption capacity prediction based on filling adsorption.

BACKGROUND ART

The emission of volatile organic compounds (VOCs) not only causes serious pollution to the environment, but also causes direct or indirect harm to human health. At present, the terminal treatment technologies of VOCs mainly include: catalytic combustion, biodegradation, low temperature plasma, photocatalytic degradation, adsorption recovery, condensation and membrane separation. Wherein, the adsorption method has the advantages of easy operation, high purification efficiency, wide application range, and can be combined with other treatment technologies, it is widely used in VOCs treatment and recovery, and is one of the most widely used VOCs control technologies. The development of adsorption materials is an important basis for the development of VOCs adsorption technology, the selection of adsorption materials needs to comprehensively consider many factors such as the structural properties, cost, adsorption capacity, adsorption rate, regeneration performance of the materials and their matching relationship with the adsorbed VOCs waste gas.

Although adsorption technology has been widely used in the treatment of VOCs, there are still many scientific problems that have not been solved in the VOCs adsorption process, for example, the specific structure-activity relationship between the pore structure of the adsorbent materials and the adsorption capacity of VOCs is not clear enough. The adsorption process of VOCs by adsorption materials can be affected by many factors. Firstly, the properties of adsorption materials such as pore structure and surface properties are the main factors affecting adsorption; secondly, the large differences in the physical and chemical properties (such as polarity, boiling point, molecular weight, etc.) of VOCs lead to the fact that the adsorption process can not be simply generalized; in addition, the adsorption environment, such as temperature, humidity and coexisting pollutants, would also have an important impact on the adsorption process. Therefore, due to the complexity of the VOCs adsorption process, the existing guidance laws are usually not accurate enough, for example, it is generally accepted that the larger specific surface area can lead to higher VOCs adsorption capacity, and micropores can provide strong adsorption force but also make desorption difficult. These rules are usually not accurate enough, and a large number of attempts and explorations are still needed to find possible suitable adsorption materials for specific applications.

In the current studies, many influencing factors are mixed together, only in the series samples of the researchers, some positive or negative correlations between adsorption capacity and specific surface, average pore size, porosity and other parameters can be obtained. Overall, these rules are generally vague and are not accurate enough to guide the further development of VOCs adsorption technologies and adsorption materials. The further optimization of the pore structure of the adsorbent materials lacks a quantitative reference between the pore size and the adsorption performance. If there is a prediction method for the adsorption capacity, which can predict the adsorption capacity of the material to a specific VOCs at a specific pressure and temperature according to the pore structure and other properties of the adsorption materials, it will be able to provide a strong reference for the development of adsorption technology and adsorption materials.

At present, there is no prediction method for the adsorption capacity that can be extended to the adsorption and recovery of different VOCs species at different temperatures and pressures, which limits the development of adsorption materials with specificity for specific VOCs to a certain extent.

SUMMARY

In view of this, the purpose of the present invention is to provide a method for the volatile organic compounds adsorption capacity prediction based on filling adsorption. The prediction method provided by the present invention can realize the prediction of the volatile organic compounds adsorption capacity and adsorption isotherm by different adsorption materials under specific conditions.

In order to achieve the above invention purpose, the present invention provides the following technical scheme:

the present invention provides the method for the volatile organic compounds adsorption capacity prediction based on filling adsorption, including the following steps:

(1) providing two or more porous materials with concentrated pore size distribution as model adsorption materials, testing pore structure parameters, testing adsorption isotherms of adsorption materials for specific VOCs at specific adsorption temperatures, and obtaining adsorption capacities Q of the adsorption material under different pressures;

(2) obtaining a corresponding pressure interval when the filling adsorption occurs in each model adsorption material according to the adsorption isotherm, taking an intermediate value of the pressure stage at which the adsorption capacity increased rapidly as a critical pressure point $P_C$, making the critical pressure point $P_C$ correspond to the intermediate value of the pore size distribution of the adsorbent material, taking the intermediate value of the pore size distribution as a critical pore size $D_C$ below which filling adsorption can occur at the critical pressure point $P_C$;

(3) taking the critical pore size $D_C$ as a demarcation point, obtaining a pore volume $V_C$ of the adsorption materials below the critical pore size $D_C$ and a specific surface area of the pore $S_C$ above the critical pore size $D_C$, respectively, according to the results of pore structure test;

(4) the adsorption capacity Q, pore volume $V_C$ and specific surface area $S_C$ meet the prediction equation $Q=f(V_C, S_C)$ of volatile organic compounds adsorption capacity based on filling adsorption, i.e. formula 1:

$$Q = f(V_C, S_C) = a \times \rho \times V_C + b \times S_C; \qquad \text{(formula 1)}$$

wherein, Q is the adsorption capacity of VOCs by adsorption materials per unit mass, g/g;

a is the coefficient of filling adsorption, no unit;

$\rho$ is the density of liquid VOCs at specific adsorption temperature, g/cm³;

$V_C$ is the pore volume of the pores below the critical pore size $D_C$, cm³/g;

b is the adsorption amount of VOCs per unit specific surface area through covering adsorption, g/m²;

$S_C$ is the specific surface area of the pores above the critical pore size $D_C$, m²/g;

(5) testing the adsorption isotherms of the other adsorption materials for specific VOCs at the same adsorption temperature, according to steps (1)~(3), obtaining the adsorption capacity Q, pore volume $V_C$ and specific surface area $S_C$ which corresponds to the remaining adsorption materials, introducing into formula 1 to obtain the specific values of a and b, and obtaining a prediction equation of volatile organic compounds adsorption capacity based on filling adsorption.

Preferably, the number of adsorption materials with a concentrated pore size distribution is ≥2;

Preferably, the step (1) also includes:

performing a test using a commercial specific surface area and pore structure analyzer, obtaining the pore structure parameters of the adsorption materials through the calculation model of DFT cylindrical pore, wherein pore structure parameters include pore size distribution, pore volume within a specific pore size range, specific surface area within a specific pore size range.

Preferably, the step (2) also includes:

obtaining a linear relationship between the pressure point $P_C$ and the critical pore size $D_C$ according to the pressure points and the corresponding critical pore size $D_C$ of the two or more adsorption materials with concentrated pore size distribution, i.e. formula 2:

$$D_C = k \times P_C + D_0; \qquad \text{(formula 2)}$$

wherein, $D_C$ is the critical pore size below which filling adsorption can occur at the pressure point $P_C$, nm;

k is the slope of the linear relationship between the critical pore size and the pressure, nm/mbar;

$D_0$ is the value of $D_C$ in the linear relationship when the pressure approaches 0, nm;

according to formula 2, combined with the pore structure parameters of the adsorption materials, calculating the pore volume $V_C$ of pores which is below the corresponding critical pore size $D_C$, and calculating the specific surface area $S_C$ of pores which is above the critical pore size $D_C$, respectively.

Preferably, it also includes introducing the pore size difference and the pressure change into the VOCs adsorption capacity prediction equation for calibration, the adsorption capacity prediction at different pressures can be obtained, i.e. formula 3:

$$Q = f(D_A, P) \times \rho \times V_C + g(P) \times S_C; \qquad \text{(formula 3)}$$

wherein, Q is the adsorption capacity of VOCs per unit mass of adsorption materials, g/g;

$D_A$ is the average pore size of pores in which filling adsorption occurred, nm; wherein, $D_A = 4V_C/(S-S_C)$, S is the total specific surface area, m²/g;

$f(D_A, P)$ indicates that the filling adsorption coefficient a is a function of the pore size $D_A$ and the pressure P;

ρ is the density of liquid VOCs at specific adsorption temperature, g/cm³;

$V_C$ is the pore volume of the pores below the critical pore size $D_C$, cm³/g;

g(P) indicates that the covering adsorption coefficient b is a function of pressure P;

$S_C$ is the specific surface area of the pores above the critical pore size, m²/g.

Preferably, $f(D_A, P)$ satisfies formula 4:

$$f(D_A, P) = (a_0 + a_1 \times (D_A - D_0) + a_2 \times P); \qquad \text{(formula 4)}$$

wherein, $a_0$ is the part of coefficient a that is not affected by pore size and pressure change, no unit;

$a_1$ is the part of coefficient a that affected by the pore size difference, nm⁻¹;

$a_2$ is the part of coefficient a that affected by pressure change, mbar⁻¹;

$D_0$ is the value of $D_C$ when the pressure approaches 0 in the linear relationship between the critical pore size and the critical pressure, nm;

g(P) satisfies formula 5:

$$g(P) = (b_0 + b_2 \times P); \qquad \text{(formula 5)}$$

wherein, $b_0$ is the part of coefficient b that is not affected by pore size and pressure change, g/m²;

$b_2$ is the part of coefficient b that is affected by the pressure change, g/m²/mbar.

Preferably, the model adsorption materials are one or more of ordered mesoporous silica, ordered mesoporous carbon and molecular sieves.

Preferably, the VOCs are one of hydrocarbon organics, oxygen-containing organics, halogen-containing organics, nitrogen-containing organics and sulfur-containing organics.

The present invention provides the method for the volatile organic compounds adsorption capacity prediction based on filling adsorption, the present invention adopts the method of controlling variables, and uses two or more porous materials with concentrated pore size distribution as model adsorption materials, under certain conditions (specific VOCs type, temperature, pressure), to explore the critical pore size $D_C$ of the pores that can occur filling adsorption. Because the filling adsorption follows the volume filling mechanism of the adsorption space, and the density of adsorbates is close to its liquid density (ρ), therefore, the adsorption capacity of this part is related to the density and the pore volume where filling adsorption occurred. The pores larger than De without filling adsorption are the surface covering adsorption mechanism of monolayer or multilayer adsorption, and the adsorption capacity is related to the corresponding specific surface area. On this basis, according to the pore volume of the filling adsorption and the specific surface area of surface covering adsorption, respectively, set a linear equation. Using the pore structure parameters and their VOCs adsorption capacity of two or more model materials as known data, the coefficient of the equation can be solved, therefore, the equation for VOCs adsorption capacity and isotherm prediction is obtained. The equation can be used to predict the VOCs adsorption capacity, under the same or similar adsorption conditions, through the pore structure parameters of the adsorption materials. On the basis of this equation, by introducing the variation of critical pore size $D_C$ with pressure P, the adsorption capacity corresponding to different adsorption pressure point can be predicted, thus forming adsorption isotherm. By introducing the influence of pore size difference and pressure change on the adsorption capacity, the coefficients of the equation can be calibrated, and the equation that can predict the adsorption capacity and adsorption isotherm of specific VOCs according to the pore structure parameters of the adsorbent material, is obtained.

The method for the volatile organic compounds adsorption capacity prediction based on filling adsorption provided by the invention has a solid theoretical basis, and each variable in the equation has a clear physical meaning. The prediction method provided by the invention has advantages of simple calculation, clear physical meaning, high accuracy and wide application range, which can provide a reference for the selection of adsorption materials suitable for different VOCs, and provide theoretical support for the design of efficient VOCs adsorption materials, the study of adsorption-desorption process and the optimization of VOCs adsorption process. The method for the volatile organic compounds adsorption capacity prediction based on filling adsorption provided by the invention has good extensibility and is also suitable for other adsorption materials without concentrated pore size distribution, it can predict the adsorption capacity and adsorption isotherm of specific VOCs at a specific temperature; and it can be extended to other adsorption materials that are different from the surface properties of model adsorption materials by correcting the filling adsorption and covering adsorption coefficients, and predict the adsorption capacity and adsorption isotherm of specific VOCs at a specific temperature. The results of the implementation example show that the similarity between the predicted adsorption capacity obtained by the prediction method provided by the invention and the actual test adsorption capacity is 93.5~100%, the predicted adsorption isotherms can coincide well with the measured adsorption isotherms, and has good accuracy and scalability.

DETAILED DESCRIPTION OF THE EMBODIMENTS

Figure 1:
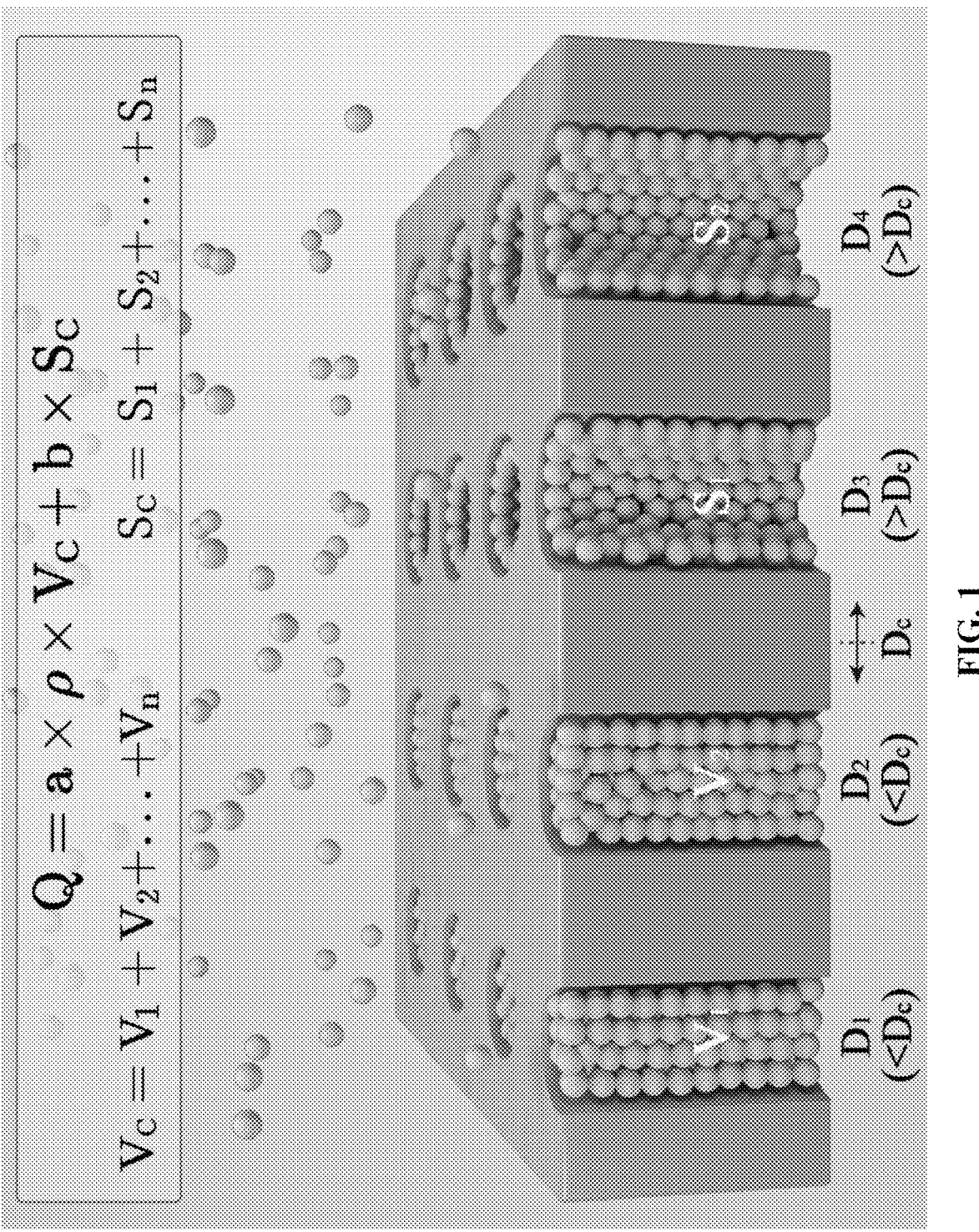
FIG. 1 is a schematic diagram of a method for the volatile organic compounds adsorption capacity prediction based on filling adsorption.

The present invention provides a method for the volatile organic compounds adsorption capacity prediction based on filling adsorption, including the following steps:

(1) providing two or more porous materials with concentrated pore size distribution as model adsorption materials, testing pore structure parameters, testing adsorption isotherms of adsorption materials for specific VOCs at specific adsorption temperatures, and obtaining an adsorption capacity Q of the adsorption materials under different pressures;

(2) obtaining a corresponding pressure interval when the filling adsorption occurs in each model adsorption material according to the adsorption isotherm, taking an intermediate value of the pressure interval as a critical pressure point $P_C$, making the critical pressure point $P_C$ correspond to the intermediate value of the pore size distribution of the adsorbent material, taking the intermediate value of the pore size distribution as a critical pore size $D_C$ below which filling adsorption can occur at the critical pressure point $P_C$;

(3) taking the critical pore size $D_C$ as a demarcation point, obtaining a pore volume $V_C$ of the adsorption materials below the critical pore size $D_C$ and a specific surface area of the pore $S_C$ above the critical pore size $D_C$, respectively, according to the results of pore structure test;

(4) the adsorption capacity Q, pore volume $V_C$ and specific surface area $S_C$ meet the prediction equation $Q=f(V_C, S_C)$ of volatile organic compounds adsorption capacity based on filling adsorption, i.e. formula 1:

$$Q = f(V_C, S_C) = a \times \rho \times V_C + b \times S_C; \qquad \text{(formula 1)}$$

wherein, Q is the adsorption capacity of VOCs by adsorption materials per unit mass, g/g;

a is the coefficient of filling adsorption, no unit;

$\rho$ is the density of liquid VOCs at specific adsorption temperature, g/cm³;

$V_C$ is the pore volume of the pores below the critical pore size $D_C$, cm³/g;

b is the adsorption amount of VOCs per unit specific surface area through covering adsorption, g/m²;

$S_C$ is the specific surface area of the pores above the critical pore size $D_C$, m²/g;

(5) testing the adsorption isotherms of the other adsorption materials for specific VOCs at the same adsorption temperature, according to steps (1)~(3), obtaining the adsorption capacity Q, pore volume $V_C$ and specific surface area $S_C$ which corresponds to the remaining adsorption materials, placing into formula 1 to obtain the specific values of a and b, and obtaining a prediction equation of volatile organic compounds adsorption capacity based on filling adsorption.

The present invention employs two or more porous materials with concentrated pore size distribution as model adsorption materials, tests the pore structure parameters, tests the adsorption isotherm of the adsorption materials to specific VOCs at a specific adsorption temperature, and obtains the adsorption capacity Q of the adsorption materials at different pressures. In this invention, when the pore size distribution is concentrated within the range of 2.0 nm, and the specific surface area of this part of the pore accounts for more than 90% of the total specific surface area of the material, it is set as an adsorption material with a concentrated pore size distribution. In this invention, the number of adsorption materials with concentrated pore size distribution is preferably ≥2.

In the invention, the model adsorption material is a porous material with a concentrated pore size distribution, preferably one or more of ordered mesoporous silicon, ordered mesoporous carbon and molecular sieve; VOCs are preferably one of hydrocarbon organics, oxygen-containing organics, halogen-containing organics, nitrogen-containing organics and sulfur-containing organics; in the invention, the hydrocarbon organic matter is preferably one of alkane, olefin, alkyne and aromatic hydrocarbon; the oxygen-containing organics are preferably one of the aldehydes, ketones, alcohols and esters organic matter. As a specific embodiment of the invention, the VOCs are preferably one of benzene, ethyl acetate and acetone.

In this invention, the adsorption material needs to have a concentrated pore size distribution, thereby eliminating the influence of pores of other sizes on the adsorption process. In this invention, the concentrated pore size distribution of the adsorption material is in the range of micropores and small mesopores, approximately equal to or several times the molecular size of VOCs.

In the invention, performing the test using a commercial specific surface area and pore structure analyzer, obtaining the pore structure parameters of the adsorption materials through the calculation model of DFT cylindrical pore, wherein pore structure parameters include pore size distribution, pore volume within a specific pore size range, specific surface area within a specific pore size range.

According to the adsorption isotherm, the present invention obtains the pressure interval corresponding to the filling adsorption of each model adsorption material, the intermediate value of the pressure stage at which the adsorption capacity increased rapidly is taken as the critical pressure point $P_C$, the critical pressure point $P_C$ corresponds to the intermediate value of the pore size distribution of the adsorbent material, the intermediate value of the pore size distribution is used as the critical pore size $D_C$ under the critical pressure point $P_C$, at which filling adsorption can occur. For the adsorption materials with concentrated pore size distribution, the adsorption isotherm is a typical type VI adsorption isotherm, when the filling adsorption occurs, the adsorption capacity will increase rapidly in a specific pressure interval, and the pressure corresponding to the filling adsorption of the adsorption materials with a specific pore size can be intuitively reflected from the adsorption isotherm. The middle point of the pressure interval is taken as the average number corresponding to the pore size of the model adsorption materials, then, the corresponding relationship between the pore size and pressure of the filling adsorption of specific VOCs at a specific adsorption temperature can be obtained, and the pore size is defined as the critical pore size $D_C$ under this pressure. Different adsorption pressures correspond to different critical pore sizes. Using the adsorption isotherms of VOCs on two or more model materials with concentrated pore size distribution, combined with the results of pore structure data, the one-to-one correspondence between the critical pore size of the pore structure and the pressure point for a specific VOCs at a specific adsorption temperature is derived, i.e. formula 2:

$$D_C = k \times P_C + D_0; \qquad \text{(formula 2)}$$

wherein, $D_C$ is the critical pore size below which filling adsorption can occur at the pressure point $P_C$, nm;

k is the slope of the linear relationship between the critical pore size and the pressure, nm/mbar;

$D_0$ is the value of $D_C$ in the linear relationship when the pressure approaches 0, nm;

The present invention takes the critical pore size $D_C$ as the demarcation point, according to the pore structure test results of the adsorption materials, the pore volume $V_C$ of the pores below the critical pore size $D_C$ and the specific surface area $S_C$ of the pores above the critical pore size $D_C$ are obtained, respectively. The filling adsorption follows the volume filling mechanism of the adsorption space, and the VOCs adsorption capacity in this part of the pores is directly related to the pore volume. The pores without filling adsorption are the surface covering adsorption mechanism of single-layer or multi-layer adsorption, and the adsorption capacity of VOCs by these pores is directly related to the specific surface area. The adsorption mechanism of the two parts is different, so the contribution and calculation method of VOCs adsorption are also different.

According to the critical pore size of the filling adsorption at a specific pressure, the coefficients (a and b) are assigned to the pore volume ($V_C$) of the pores with filling adsorption and the specific surface area ($S_C$) of the pores with surface-covering adsorption, respectively, the adsorption capacity Q, pore volume $V_C$ and specific surface area $S_C$ meet the prediction equation $Q=f(V_C, S_C)$ of volatile organic compounds adsorption capacity based on filling adsorption, i.e. formula 1:

$$Q = f(V_C, S_C) = a \times \rho \times V_C + b \times S_C; \qquad \text{(formula 1)}$$

wherein, Q is the adsorption capacity of VOCs by adsorption materials per unit mass, g/g;

a is the coefficient of filling adsorption, no unit;

ρ is the density of liquid VOCs at specific adsorption temperature, g/cm³;

$V_C$ is the pore volume of the pores below the critical pore size $D_C$, cm³/g;

b is the adsorption amount of VOCs per unit specific surface area through covering adsorption, g/m²;

$S_C$ is the specific surface area of the pores above the critical pore size $D_C$, m²/g.

The present invention tests the adsorption isotherms of other adsorption materials for specific VOCs at the same adsorption temperature, According to steps (1)~(3), the adsorption capacity Q, pore volume $V_C$ and specific surface area $S_C$ of the remaining adsorption materials are obtained, the data of two of the samples are taken into the formula 1 to solve the specific values of a and b, and the prediction equation of the adsorption amount of volatile organic compounds based on the filling adsorption is obtained. In this invention, the pore structure parameters of the model material and its adsorption capacity for VOCs are obtained as known data by combining the pore structure and adsorption capacity tests, the adsorption capacity (Q), density (ρ), pore volume ($V_C$) and specific surface area ($S_C$) in the equation are all known, only the coefficient (a) of the filling adsorption and the coefficient (b) of the covering adsorption are unknown, by taking the pore structure parameters and adsorption capacity of any two model adsorption materials into the equation, two coefficients a and b of the linear equation can be solved. The solved coefficients are brought back to the linear equation, and finally an equation that can predict the adsorption capacity of specific VOCs under certain conditions according to the pore structure parameters of porous adsorption materials is formed.

In this invention, the accuracy of prediction can be improved by refining the contribution of pores of different sizes to the adsorption capacity of filling adsorption and covering adsorption, and the influence of pressure change on the adsorption process. For the part of the filling adsorption, there are also some differences in the density of VOCs molecules in the pores of different sizes; with the increase of adsorption pressure, the adsorbed VOCs can undergo molecular rearrangement, resulting in a slight increase in the density of VOCs adsorbed by the filling adsorption. In the area where the covering adsorption occurs, the adsorption capacity per unit area also shows an increasing trend with the increase of pressure; meanwhile, the difference in pore size will also have a certain impact on the adsorption capacity provided by the unit area. Therefore, the pore size and pressure can be further introduced into the VOCs adsorption prediction equation as parameters, the contribution of the coefficient a of the filling adsorption and the coefficient b of the covering adsorption are further calibrated, thereby further improving the accuracy of equation prediction.

The present invention introduces pore size and pressure as parameters into the prediction equation of volatile organic compounds adsorption capacity prediction based on filling and covering adsorption, i.e. formula 3:

$$Q = f(D_A, P) \times \rho \times V_C + g(P) \times Sc; \qquad \text{(formula 3)}$$

wherein, Q is the adsorption capacity of VOCs per unit mass of adsorption materials, g/g;

$D_A$ is the average pore size of pores below which filling adsorption occurred, nm; wherein, $D_A=4V_C/(S-S_C)$, S is the total specific surface area, $m^2/g$;

$f(D_A,P)$ indicates that the coefficient a of the filling adsorption is a function of the pore size $D_A$ and the pressure P;

$\rho$ is the density of liquid VOCs at specific adsorption temperature, $g/cm^3$;

$V_C$ is the pore volume of the pores below the critical pore size $D_C$, $cm^3/g$;

$g(P)$ indicates that the coefficient b of covering adsorption is a function of pressure P;

$S_C$ is the specific surface area of the pores above the critical pore size, $m^2/g$.

In this invention, $$f(D_A, P) \text{ satisfies } f(D_A, P) = (a_0 + a_1 \times (D_A - D_0) + a_2 \times P); \quad \text{(formula 4)}$$

wherein, $a_0$ is the part of coefficient a that is not affected by pore size and pressure change, no unit; $a_1$ is the part coefficient a that is affected by the difference of pore size, $nm^{-1}$; $a_2$ is the part of coefficient a that is affected by pressure change in coefficient a, $mbar^{-1}$; $D_0$ is the $D_C$ value when the pressure approaches 0 in the linear relationship between the critical pore size and the critical pressure, nm;

$$g(P) \text{ satisfies } g(P) = (b_0 + b_2 \times P); \qquad \text{(formula 5)}$$

wherein, $b_0$ is the part of coefficient b that is not affected by pore size and pressure change, $g/m^2$; $b_2$ is the coefficient of the part of coefficient b that is affected by the change of pressure, $g/m^2/mbar$.

In this invention, the schematic diagram of the method for the volatile organic compounds adsorption capacity prediction based on filling adsorption is shown in FIG. 1. In FIG. 1, under specific adsorption conditions (specific VOCs types, temperature, pressure), the pores with pore size smaller than the critical pore size ($D_C$) have filling adsorption, however, covering adsorption occurs in pores larger than the critical pore size ($D_C$). The pore structure data can be tested by commercial instruments, the pore volumes ($V_C=V_1+V_2+\ldots V_n$) of the pores smaller than the critical pore size ($D_C$) and the specific surface area ($S_C=S_1+S_2+\ldots +S_n$) of the pores larger than the critical pore size ($D_C$) are obtained, respectively. According to the coefficients of ($V_C$) and ($S_C$) obtained by the method of the invention, an equation for predicting the adsorption capacity of specific VOCs can be obtained, and the calibrated adsorption prediction equation can be obtained by introducing the influence of pore size difference and pressure change, this equation can be used to predict the adsorption capacity of VOCs by other adsorption materials under the same or similar adsorption conditions.

In the following, the method for the volatile organic compounds adsorption capacity prediction based on filling adsorption provided by the invention is described in detail in combination with the embodiments, but they cannot be understood as the limitation of the protection range of the present invention.

Embodiment 1

Figure 2:
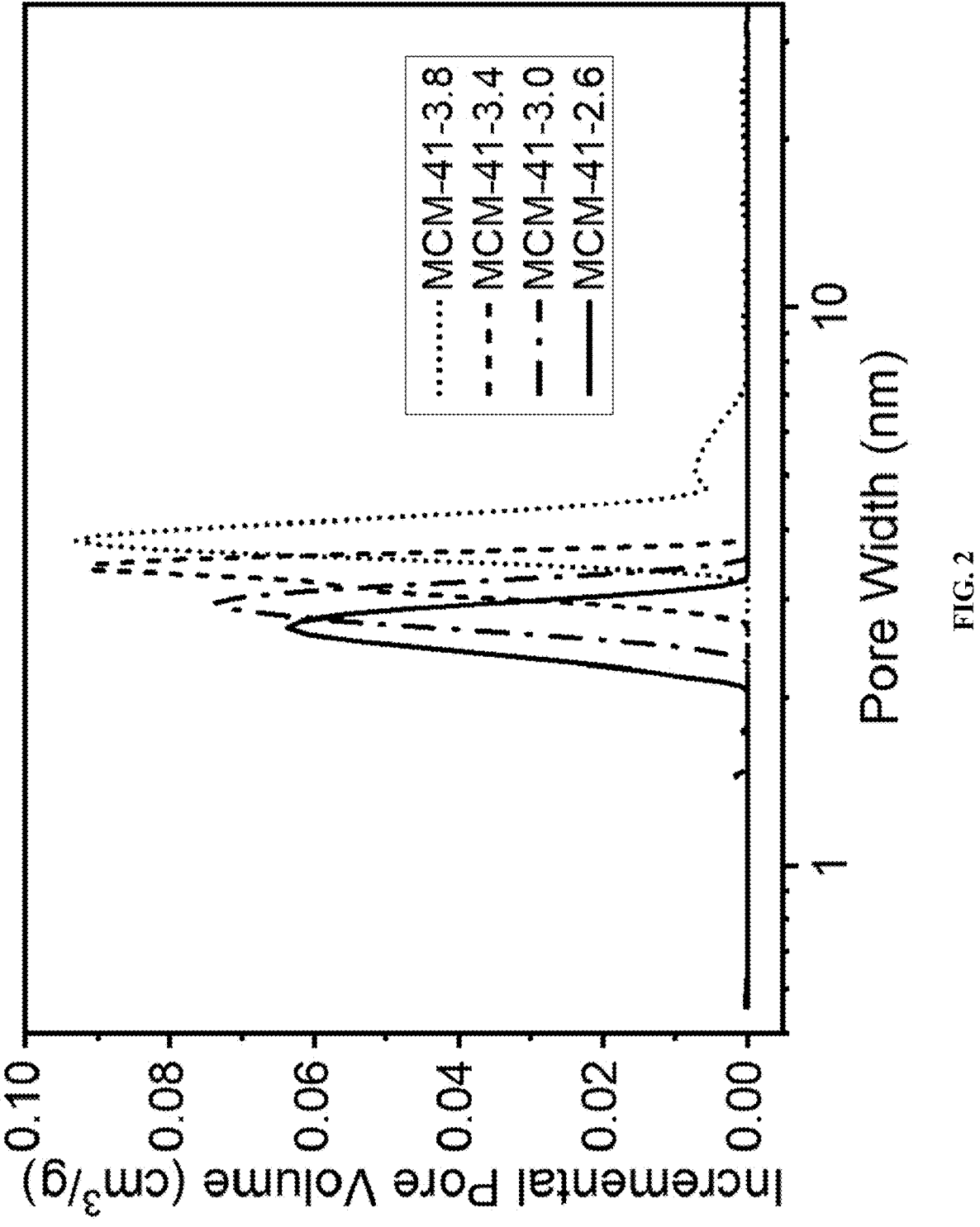
FIG. 2 shows a pore size distribution of MCM-41-2.6, MCM-41-3.0, MCM-41-3.4 and MCM-41-3.8.
Figure 4:
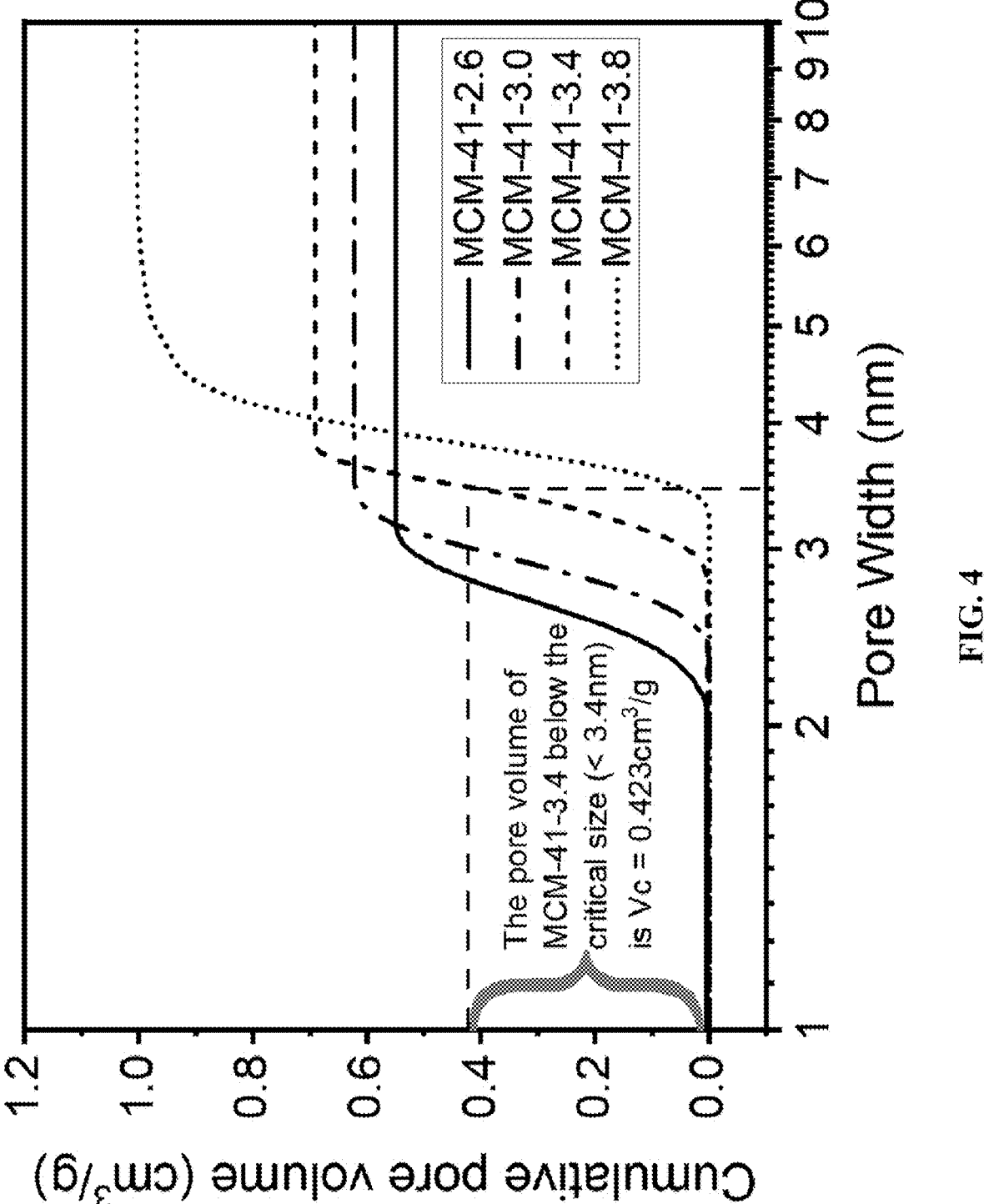
FIG. 4 is a pore volume of the pores within a specific pore size range of embodiment 1.
Figure 5:
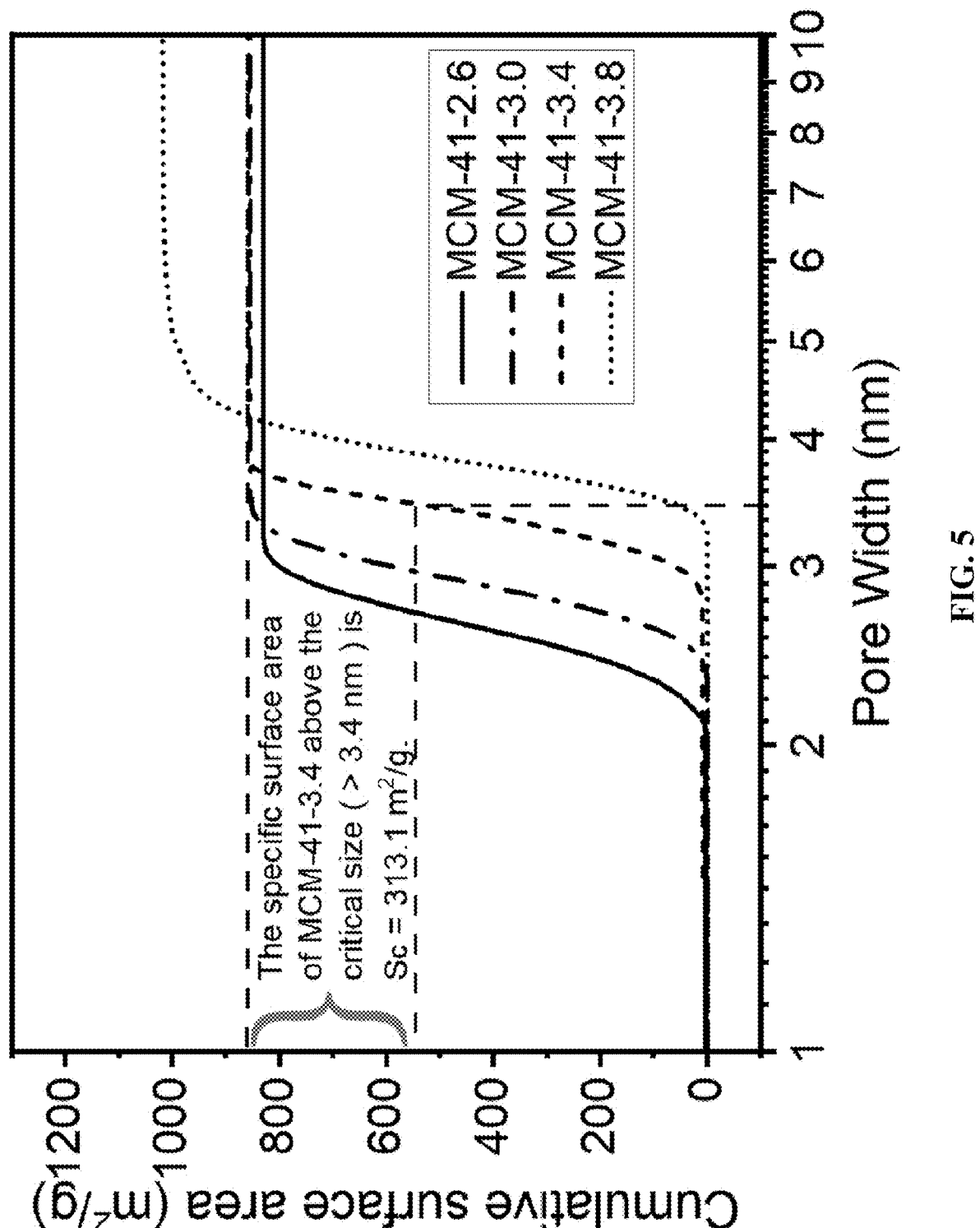
FIG. 5 is a specific surface area of the pores within a specific pore size range of embodiment 1.

A series of ordered mesoporous silica MCM-41 materials with concentrated pore size distribution are used as model adsorption materials, they are MCM-41-2.6, MCM-41-3.0, MCM-41-3.4, MCM-41-3.8, respectively. The pore size distribution of the material is obtained by the DFT cylindrical pore calculation model using a commercial pore structure and specific surface area analyzer, and the results are shown in FIG. 2. It can be seen that the pore size distribution is concentrated at 2.6 nm, 3.0 nm, 3.4 nm, and 3.8 nm, respectively. The pore volume in a specific pore size range and the specific surface area of the pores in a specific pore size range are obtained by using the cumulative pore volume and cumulative specific surface area distribution curves, respectively, wherein, the pore volume of the pores in a specific pore size range is shown in FIG. 4, and the specific surface area of the pores in a specific pore size range is shown in FIG. 5.

Figure 3:
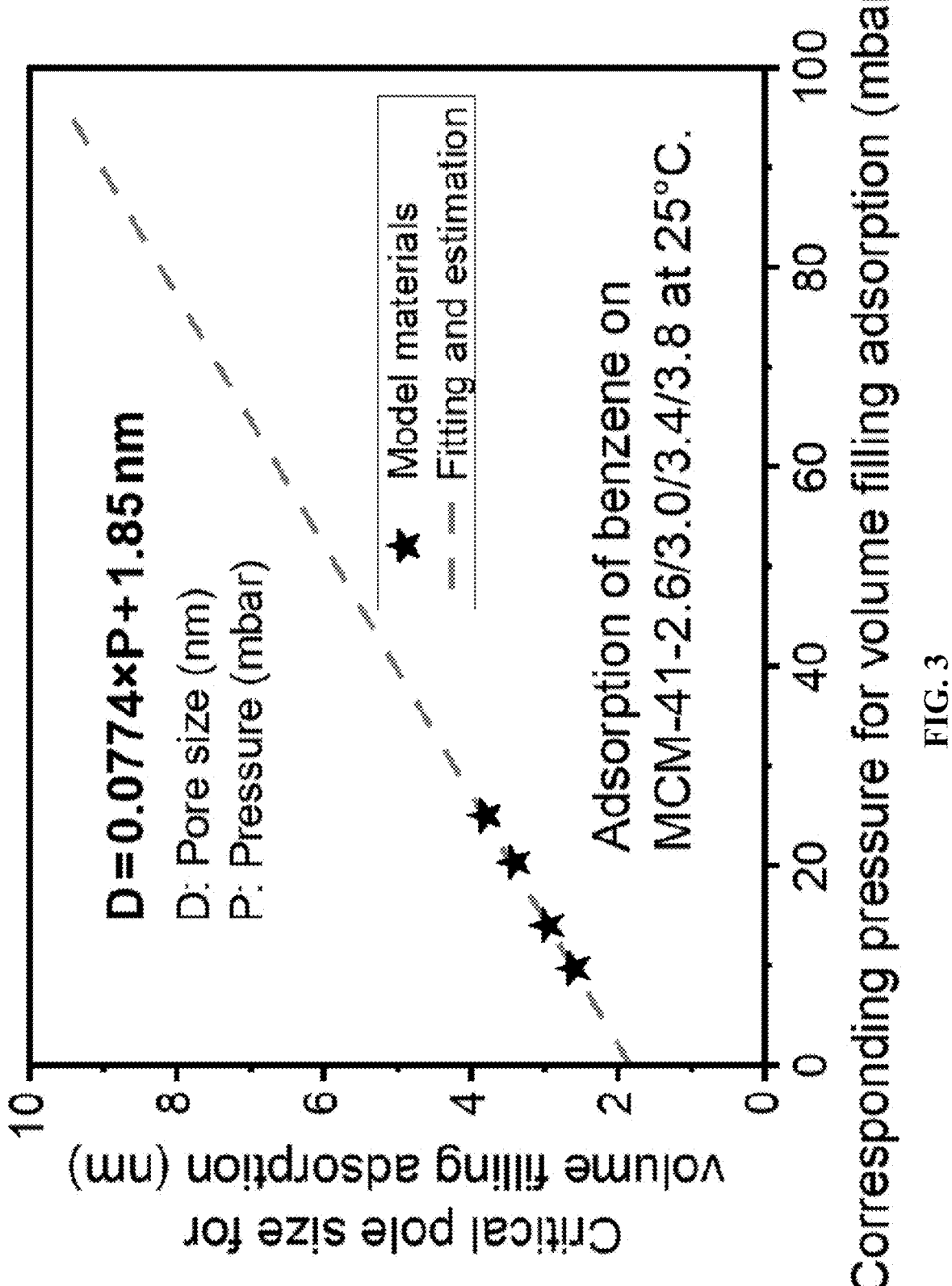
FIG. 3 shows a linear relationship between pressure and critical pore size $D_C$ of embodiment 1.

The adsorption capacity of benzene on a series of adsorption materials at 25° C. is tested by an intelligent gravimetric analyzer (IGA), and the adsorption isotherm is obtained. For the four MCM-41 adsorption materials, the pressures at the intermediate point of the fast rising stage on the adsorption isotherms are 9.7, 14.0, 20.3 and 25.0 mbar, respectively, and the corresponding most probable pore sizes of the four adsorbents are 2.6, 3.0, 3.4 and 3.8 nm, respectively, as shown in the measured adsorption isotherms in FIG. 6 and the pore size distribution curves in FIG. 2. It can be found that the larger the pore size of the adsorbent material, the higher the pressure required for the corresponding filling adsorption. There is a linear relationship between the pressure and the corresponding critical pore size, which can be used to estimate the critical pore size corresponding to the filling adsorption under different pressures. According to the parameters (P=9.7 mbar, $D_C$=2.6 nm) and (P=25 mbar, $D_C$=3.8 nm) of MCM-41-2.6 and MCM-41-3.8, the linear relationship equation $D_C$=k×P+$D_0$ is obtained, which is the one-to-one correspondence between the critical pore size and the pressure point. The linear equation is $D_C$=0.0774× P+1.85, wherein, P is the pressure, and $D_C$ is the critical pore size below which the filling adsorption can occur, according to this equation, the critical pore size corresponding to the filling adsorption at different pressures can be obtained, the linear relationship between the pressure and the critical pore size De is shown in FIG. 3.

Taking MCM-41-2.6 and MCM-41-3.8 as examples, the corresponding adsorption capacity prediction equation at through covering adsorption, g/m², and $S_C$ is the specific surface area (m²/g) of pores above the critical pore size.

Using the above equations, the critical pore volume $V_C$ and the critical specific surface area $S_C$ of MCM-41-3.0 and MCM-41-3.4 are introduced into the equations, and the adsorption capacities of the two adsorbents for benzene at 20.3 mbar are predicted to be 0.454 g/g and 0.400 g/g, respectively. The predicted adsorption capacities of the four adsorbents are obtained by taking the measured adsorption capacities and pore structure parameters (Q, $V_C$, $S_C$) into the adsorption capacity prediction equation, and the predicted adsorption capacities are compared with the actual adsorption capacities of the four adsorbents at 20.3 mbar pressure measured by the adsorption instrument, as shown in Table 1.

Table 1 The pore structure parameters of the four adsorption materials, and the results of the measured and predicted adsorption capacity of benzene at 20.3 mbar and 25° C.

| Samples | Measured adsorption capacity at 20.3 mbar (g/g) | The most probable pore size (nm) | Pore volume below the critical pore size (<3.4 nm) (cm³/g) | Specific surface area above the critical pore size (>3.4 nm) (m²/g) | Predicted adsorption capacity at 20.3 mbar (g/g) | Similarity analysis |
|---|---|---|---|---|---|---|
| MCM-41-2.6 | 0.401 | 2.6 | 0.550 | 3.2 | 0.401 | 100% |
| MCM-41-3.0 | 0.485 | 3.0 | 0.622 | 2.6 | 0.454 | 93.5% |
| MCM-41-3.4 | 0.393 | 3.4 | 0.423 | 313.1 | 0.400 | 98.3% |
| MCM-41-3.8 | 0.319 | 3.8 | 0.052 | 960.0 | 0.319 | 100% |

20.3 mbar pressure can be derived. According to the linear equation $D_C$=0.0774×P+1.85 between the critical pore size and the pressure, the critical pore size for the occurrence of filling adsorption at 20.3 mbar can be calculated to be 3.4 nm. The critical pore size of 3.4 nm is used as the dividing line, in the adsorption materials MCM-41-2.6 and MCM-41-3.8, the critical pore volume ($V_C$) of the pores smaller than 3.4 nm is 0.55 cm³/g and 0.052 cm³/g, respectively, the critical specific surface area ($S_C$) of the pores larger than 3.4 nm is 3.2 m²/g and 960.0 m²/g, respectively. Under a certain pressure, the adsorption capacity of VOCs on the adsorption materials is the sum of two parts, and the adsorption capacity calculation equation is:

$$Q = a \times \rho \times V_C + b \times S_C$$

Using the adsorption capacity and pore structure parameters of MCM-41-2.6 and MCM-41-3.8 (Q=0.401 g/g, $V_C$=0.55 cm³/g, $S_C$=3.2 m²/g) and (Q=0.319 g/g, $V_C$=0.052 cm³/g, $S_C$=960.0 m²/g), the equations can be obtained. The parameters obtained by solving the equations are: a=0.833, b=0.000293 g/m², and the equation for predicting the adsorption capacity of VOCs is:

$$Q = 0.833 \times \rho \times V_C + 0.000293 \times S_C$$

Wherein, Q is the adsorption capacity of VOCs by adsorption materials per unit mass (g/g), a is the coefficient of filling adsorption, ρ is the density of liquid VOCs at this temperature (the density of benzene at 25° C. is 0.874 g/cm³), $V_C$ is the pore volume (cm³/g) of the pores below the critical pore size that can occur filling adsorption, b is the adsorption amount of VOCs per unit specific surface area Through this equation, according to the pore structure parameters of MCM-41-3.0 and MCM-41-3.4, the predicted adsorption capacity of the adsorption materials for benzene under the pressure of 20.3 mbar is 0.454 g/g and 0.400 g/g, respectively, the results of the adsorption capacity of benzene under the pressure of 20.3 mbar in the actual test are 0.485 and 0.393 g/g, and the similarity between the predicted and the actual measured adsorption capacity is 93.5% and 98.3%, respectively.

According to the equation $D_C$=0.0774×P+1.85, the critical pore size corresponding to different adsorption pressures can be calculated. The critical pore size $D_C$ corresponding to each pressure point in the pressure range of 0~100 mbar can be calculated respectively. Through the pore structure parameters, the corresponding critical pore volume $V_C$ and critical specific surface area $S_C$ are calculated when the critical pore size $D_C$ corresponding to each pressure point is obtained, respectively. The corresponding $V_C$ and $S_C$ at each pressure point are brought into the above adsorption prediction equation (Q=0.833×ρ×$V_C$+0.000293×$S_C$), and the adsorption amount corresponding to each pressure point could be predicted. Using the above equation (Q=0.833×ρ× $V_C$+0.000293×$S_C$), the adsorption capacity of each pressure point in the pressure range of 0~100 mbar is calculated, and the predicted adsorption isotherms are obtained, the results are shown in FIG. 6, the predicted adsorption isotherm results can objectively reflect the trend of adsorption capacity with adsorption pressure.

Figure 6:
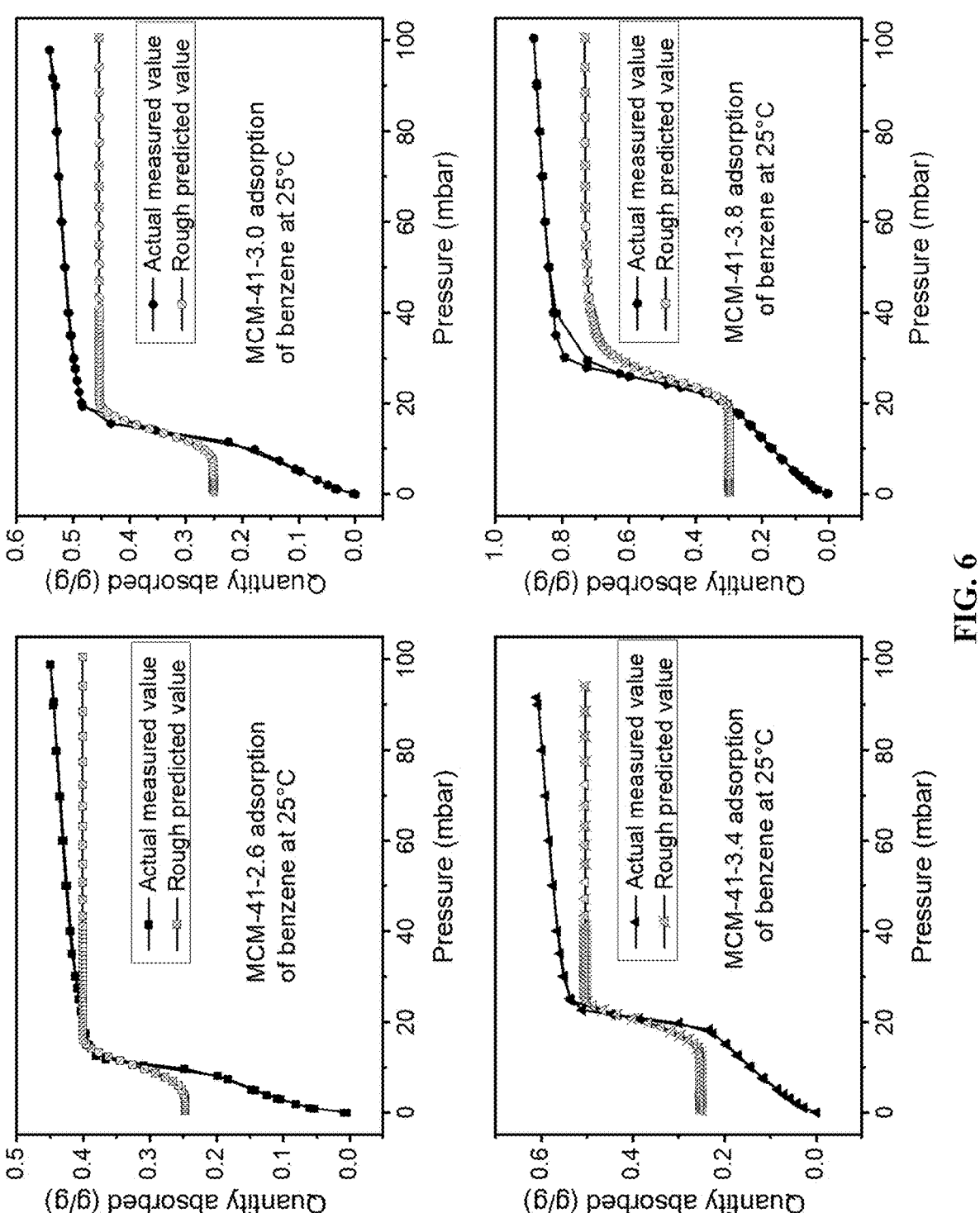
FIG. 6 is a comparison between the measured adsorption isotherm and the predicted adsorption isotherm obtained by the adsorption prediction equation before calibration of embodiment 1.

FIG. 6 is the comparison between the predicted adsorption isotherms and the measured adsorption isotherms of four adsorption materials with different pore sizes using the adsorption capacity prediction equation before calibration. It can be seen from FIG. 6 that there is a certain deviation in the relatively low and relatively high pressure ranges. The deviation in a relatively low pressure range is mainly due to the fact that within this pressure range, monolayer adsorption has not yet formed for the model material used, direct use of the above coefficients will lead to higher predicted values. The coefficient b in front of the area in this pressure range should increase with the increase of pressure, that is, the coefficient b is a function of pressure P, b=g(P). The deviation in the relatively high pressure range is due to the fact that as the pressure increases, the adsorbed benzene molecules rearrange and the density increases, resulting in a predicted adsorption amount slightly lower than the actual measured adsorption amount. Therefore, the coefficient a of the filling adsorption is a function of the pressure P. In the nanometer range where the pore size is close to the molecular size of VOCs, the larger pore size can allow sufficient rearrangement of molecules. It is closer to the density of liquid VOCs at this temperature, therefore, the coefficient a of the filling adsorption is also a function of the pore size D. That is, the coefficient a of the filling adsorption is a function of the pore size D and the pressure P a=f(D, P). Therefore, by refining the parameters and introducing the influence of pressure change and pore size, the prediction results will be further calibrated, that is, the subsequent embodiment 2.

Embodiment 2

The adsorption capacity calculation equation Q=0.833× $\rho \times V_C$+0.000293×$S_C$ of embodiment 1 can be used for the rough prediction of VOCs adsorption capacity and adsorption isotherm, meanwhile, because the adsorption of VOCs by porous materials is also affected by factors such as pressure P and pore size D. Therefore, the accuracy of the equation can be further improved by further introducing the influence of pressure and pore size into the filling adsorption coefficient a and the covering adsorption coefficient b, respectively.

For the part where filling adsorption occurs, there are also some differences in the density of VOCs molecular accumulation in pores of different sizes, the VOCs molecules in the larger pore size can be fully rearranged, making the density of VOCs adsorbed by the filling type increase, therefore, an pore size calibration factor of 0.05×($D_A$−1.85) is added to the coefficient a, the calibration factor is calculated by the difference of the adsorption capacity of the filling adsorption of the adsorbent materials with different pore size under specific pressure in embodiment 1. Wherein, $D_A$=4$V_C$/(S−$S_C$), $D_A$ is the average pore size of the pores that can occur filling adsorption under the specific pressure, S is the total specific surface area of the adsorbent material, and $S_C$ is the specific surface area of the pores larger than the critical pore size. With the increase of adsorption pressure, the filling adsorbed VOCs molecules can undergo molecular rearrangement under the action of pressure, which slightly increases the density of adsorbed VOCs, therefore, the pressure calibration factor of 0.001×P is introduced, the calibration factor is calculated according to the difference between the predicted and measured isotherms in embodiment 1 under high relative pressure. Therefore, the coefficient a of filling adsorption can be calibrated as a=(0.77+ 0.08× ($D_A$−1.85)+0.001×P). In the pore structure where covering adsorption occurs, the adsorption amount per unit area also shows an increasing trend with the increase of pressure. Therefore, the pressure calibration coefficient 0.000015×P is introduced into the coefficient b, so the coefficient b of the covering adsorption can be calibrated to b=(0.00005+0.000015×P), and the calibration coefficient is calculated according to the trend of the adsorption amount with the pressure change in the initial adsorption stage of the measured adsorption isotherm. Therefore, by introducing the pore size difference and pressure change as parameters into the VOCs adsorption prediction equation Q=a×ρ×$V_C$+ b×$S_C$, the contribution of the filling adsorption before the critical pore size and the covering adsorption after the critical pore size to the VOCs adsorption is calibrated, so as to improve the accuracy of the equation prediction. By introducing the influence of pore size and pressure, the adsorption capacity prediction equation of the modified adsorbent at 25° C. for benzene is as follows:

$$Q = (0.77 + 0.08 \times (D_A - 1.85) + 0.001 \times P) \times 0.874 \times V_C +$$
$$(0.00005 + 0.000015 \times P) \times S_C$$

Wherein, Q is the adsorption amount of benzene (g/g) per unit mass of adsorbent material at pressure P, a is the coefficient of filling adsorption (no unit), p is the density of liquid VOCs at this temperature (the density of liquid benzene at 25° C. is 0.874 g/cm$^3$), $V_C$ is the pore volume (cm$^3$/g) of the pores below the critical pore size that can undergo filling adsorption, $D_A$ is the average pore size (nm) of the pores with filling adsorption calculated by the formula $D_A$=4$V_C$/(S−$S_C$), b is the adsorption amount of VOCs per unit specific surface area through covering adsorption, g/m$^2$, $S_C$ is the specific surface area (m$^2$/g) of covering adsorption above the critical pore size, S is the total area (m$^2$/g), P is any pressure point (mbar) on the adsorption isotherm, $D_C$ is the critical pore size (nm) below which the filling adsorption can occur at a specific pressure P, the equation $D_C$=0.0774×P+ 1.85 can be used to solve the one-to-one correspondence between P and $D_C$. Combined with the pore structure parameters of the adsorbent material, the critical pore volume $V_C$ and the critical specific surface area $S_C$ of any critical pore size $D_C$ are obtained respectively. The value (P) of each pressure point on the adsorption isotherm and its corresponding pore structure parameters ($V_C$, $S_C$, S) are brought into the adsorption capacity prediction equation, and the predicted adsorption isotherm is obtained.

Figure 7:
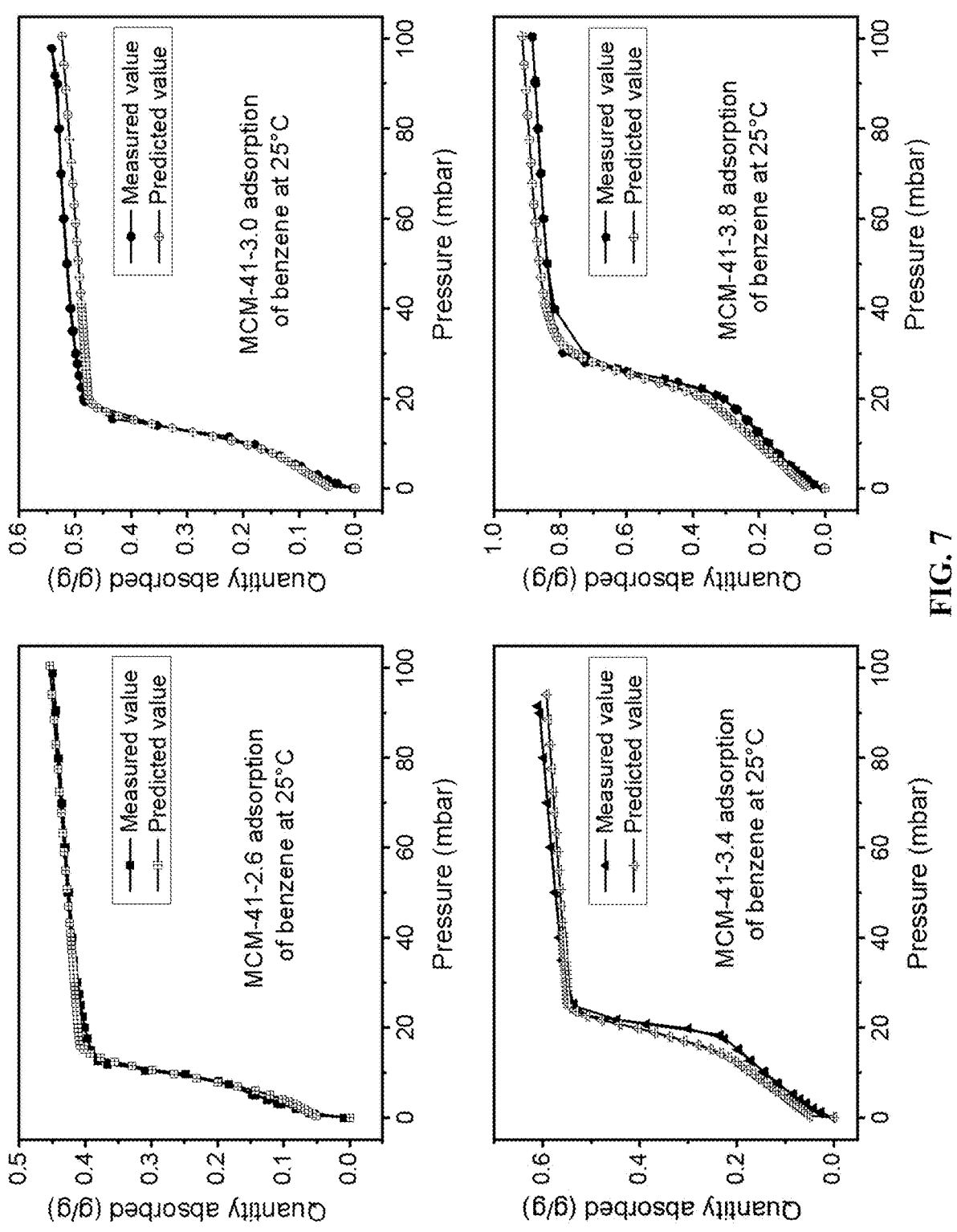
FIG. 7 is a comparison of the measured and predicted adsorption isotherms of embodiment 1.

Using the calibrated adsorption capacity prediction equation, the adsorption capacity of benzene on the adsorption materials with pressure change at 25° C. of the four model adsorption materials is calculated, and the predicted adsorption isotherm is obtained, the predicted adsorption isotherm of the adsorption materials with different pore size and the measured adsorption isotherm are shown in FIG. 7. It can be seen from FIG. 7 that the predicted adsorption isotherm can well coincide with the measured adsorption isotherm obtained by the experimental test. The adsorption capacity prediction equation, through the exploration of the critical pore size of filling adsorption, divides the adsorption of VOCs by adsorption materials into filling adsorption and covering adsorption. Combined with the influence of pore size difference and pressure change on the coefficients of the two adsorption methods, the calibrated adsorption capacity and isotherm prediction equation are obtained. According to the equation, the adsorption capacity of specific VOCs at each pressure point at the corresponding temperature can be predicted according to the pore structure parameters of the adsorption materials, and the adsorption isotherm can be obtained, which has important reference value for the development of VOCs adsorption materials and technologies.

Embodiment 3

The above embodiment 2 is based on embodiment 1, and the influence of pressure and pore size is introduced to correct the VOCs adsorption prediction equation of imple-mentation example 1, which can be effectively used to predict the adsorption isotherm of benzene at 25° C. It can be seen from the derivation process of the adsorption capacity prediction method that this method is also appli-cable to other types of VOCs. In order to verify the gener-alization of the adsorption capacity prediction method, ethyl acetate is used as the adsorbate in this embodiment, the adsorption capacity prediction equation of ethyl acetate at 25° C. is deduced by the method of embodiment 2, and it is used to predict the adsorption capacity and adsorption isotherm.

Figure 8:
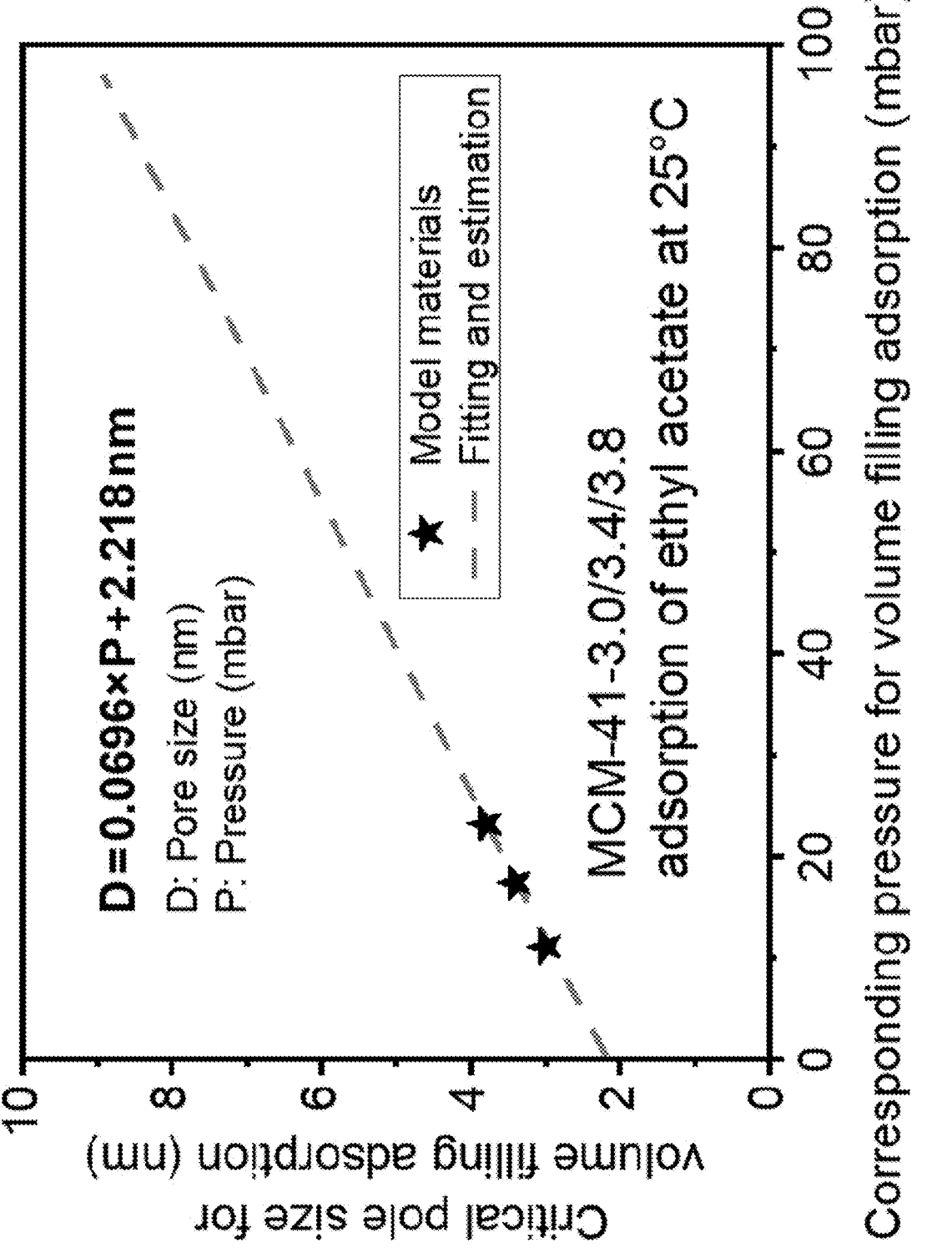
FIG. 8 is a linear relationship between the pressure and the critical pore size $D_C$ of embodiment 3.

Three MCM-41 adsorbents with the most probable pore sizes of 3.0, 3.4 and 3.8 nm in embodiment 1 are used, and the adsorption isotherms of ethyl acetate on a series of adsorption materials at 25° C. are tested, using the method of embodiment 1, the pressure at the intermediate point of the rapid rising stage on the corresponding adsorption iso-therm is 11.2, 17.1 and 22.7 mbar, respectively. The linear relationship between the pressure and the corresponding critical pore size that can occur in the adsorption of ethyl acetate by the adsorbent at 25° C. is obtained by using the method of embodiment 1, the equation is $D_C=0.0696\times P+2.2$ nm, the linear relationship is shown in FIG. 8.

By the method of embodiment 2, combined with the measured adsorption isotherms and pore structure param-eters of MCM-41-3.0 and MCM-41-3.8, the calibration factor (a=0.75+0.05× (D_A−2.2)+0.001×P, b=0.00024+ 0.000009×P) is obtained by introducing the influence of pore size difference and pressure change, the prediction equation of the adsorption capacity of the adsorption materials for ethyl acetate at 25° C. is obtained:

$$Q = (0.75 + 0.05 \times (D_A - 2.2) + 0.001 \times P) \times 0.90 \times V_C +$$
$$(0.00024 + 0.000009 \times P) \times S_C$$

Wherein, Q is the adsorption capacity of ethyl acetate per unit mass of adsorbent material at pressure P (g/g), a is the coefficient of filling adsorption (no unit), ρ is the density of liquid VOCs at this temperature (the density of ethyl acetate at 25° C. is 0.90 g/cm³), $V_C$ is the pore volume (cm³/g) of the pores below the critical pore size that can be filled with adsorption, $D_A$ is the average pore size (nm) of the pores with filling adsorption calculated by the formula $D_A=4V_C/(S-S_C)$, b is the adsorption amount of VOCs per unit specific surface area through covering adsorption, g/m², $S_C$ is the specific surface area (m²/g) of covering adsorption above the critical pore size, S is the total specific surface area (m²/g), P is any pressure point (mbar) on the adsorption isotherm, De is the critical pore size (nm) below which the filling adsorption can occur at specific pressure P, the equation $D_C=0.0696\times P+2.2$ can be used to solve the one-to-one correspondence between P and $D_C$. Combined with the pore structure parameters of the adsorption materials, the critical pore volume $V_C$ and the critical specific surface area $S_C$ at the critical pore size $D_C$ corresponding to any pressure P are calculated respectively. The value of each pressure point (P) on the adsorption isotherm and its corresponding pore structure parameters ($V_C$, $S_C$, S) are brought into the adsorp-tion capacity prediction equation to obtain the predicted adsorption isotherm.

Figure 9:
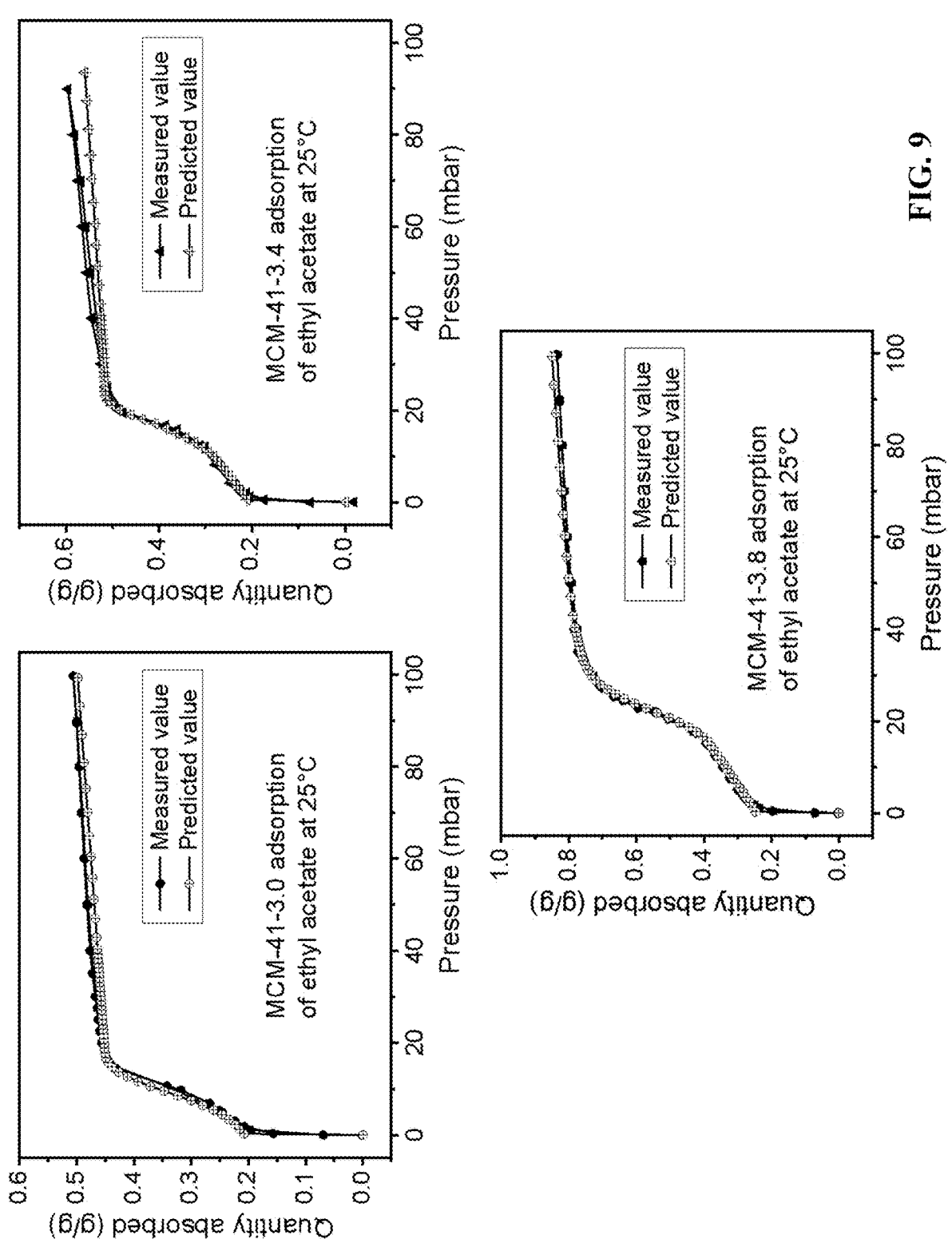
FIG. 9 is a comparison between the measured and predicted adsorption isotherms of embodiment 3.

FIG. 9 shows predicted adsorption isotherms and mea-sured adsorption isotherms of adsorption materials with different pore sizes. It can be found that the predicted and measured adsorption isotherms coincide well, indicating that the method of the invention is also applicable to the deri-vation and prediction of the adsorption capacity and adsorp-tion isotherm prediction equations of other VOCs (such as ethyl acetate). In general, the basic structure of the adsorp-tion prediction equation $Q=a\times\rho\times V_C+b\times S_C$ remains unchanged, that is, the adsorption of VOCs by porous materials includes two parts: filling adsorption and covering adsorption, the coefficients of the two adsorption modes are calibrated by introducing the influence of pressure change and pore size difference. Due to the differences in saturated vapor pressure, molecular weight, molecular size, boiling point, polarity and other properties of different VOCs, the corresponding coefficients (a and b) of filling adsorption and covering adsorption will also be different, meanwhile, the effects of pressure change and pore size difference on the two adsorption methods are also different. However, in general, the adsorption capacity prediction equation of the specific VOCs can be deduced according to the adsorption isotherm of the model adsorption materials to the specific VOCs and the pore structure parameters of the adsorption materials, indicating that the VOCs adsorption capacity and adsorption isotherm prediction method of the invention have good generalization.

Embodiment 4

It can be judged from the derivation method of the adsorption capacity prediction equation that the adsorption capacity prediction method is not limited by the type of VOCs and the adsorption temperature, and has good gen-eralization. In order to further verify the generalization of the adsorption capacity prediction method, this embodiment uses acetone as the adsorbate to test the curve of the adsorption capacity of the series of adsorption materials to acetone with pressure at 35° C., combined with the pore structure parameters and adsorption isotherms, the adsorp-tion capacity prediction formula is derived.

Three MCM-41 adsorbents with the most probable pore sizes of 3.0, 3.4 and 3.8 nm in embodiment 1 are used, the corresponding pressures at the intermediate point of the fast rising stage on the adsorption isotherm are 54.2, 95.4 and 137.1 mbar, respectively.

Figure 10:
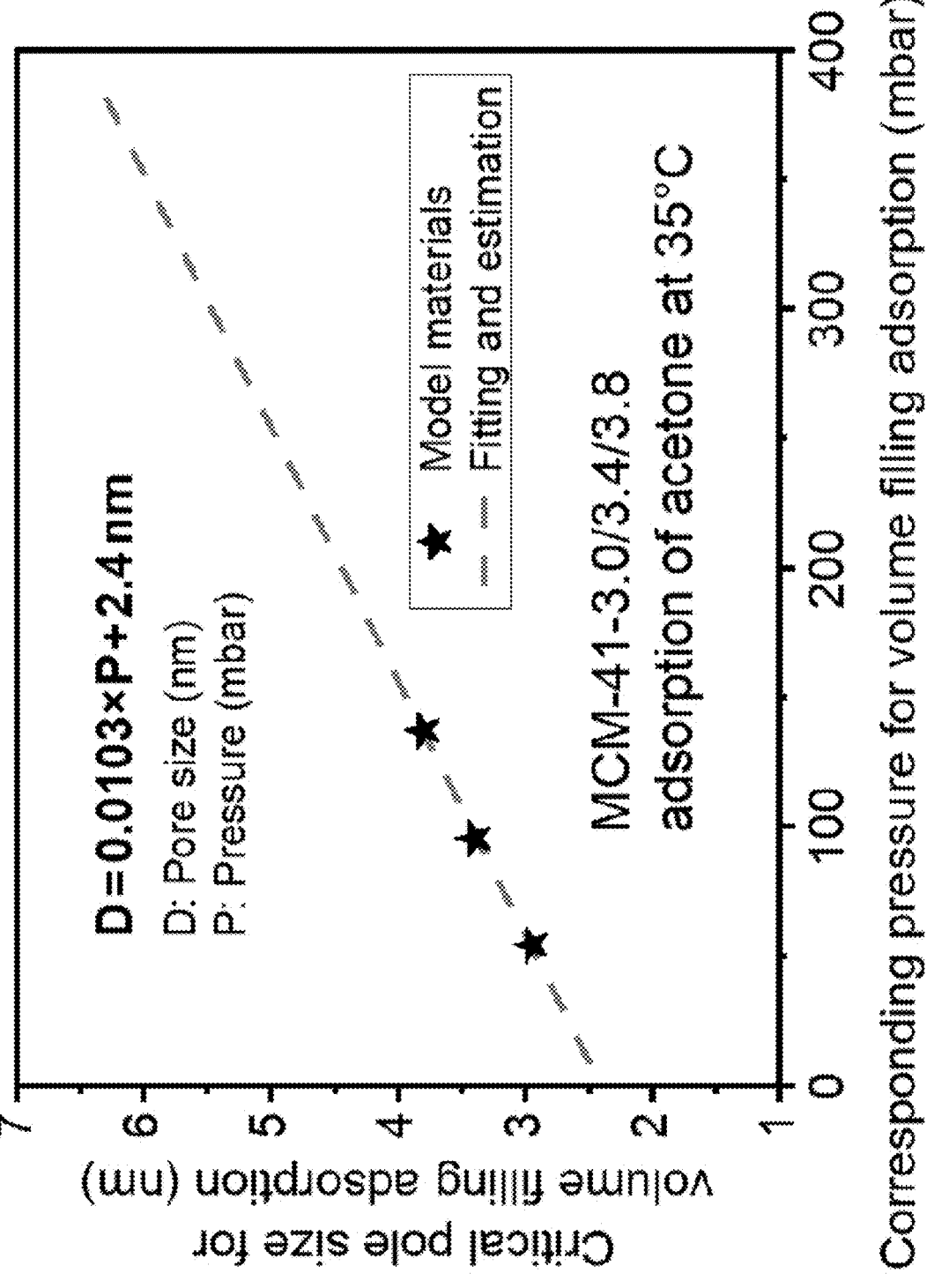
FIG. 10 is a linear relationship between the pressure and the critical pore size $D_C$ of embodiment 4.

Using the method of embodiment 1, the linear relation-ship between the pressure and the corresponding critical pore size of the filling adsorption is obtained in the adsorp-tion of acetone at 35° C., the equation is $D_C=0.0103\times P+2.4$ nm, and the linear relationship is shown in FIG. 10. By implementing the method of embodiment 2, the calibration factor (a=0.61+0.12×(D_A−2.4)+0.00035×P, b=0.00017+ 0.0000017×P) of pore size and pressure is introduced, and the prediction equation of adsorption capacity of adsorption materials to acetone at 35° C. is obtained:

$$Q = (0.61 + 0.12 \times (D_A - 2.4) + 0.00035 \times P) \times 0.773 \times V_C +$$
$$(0.00017 + 0.0000017 \times P) \times S_C$$

Wherein, Q is the adsorption capacity of acetone per unit mass of adsorption materials at constant pressure P(g/g), a is the coefficient of filling adsorption (no unit), ρ is the density of liquid VOCs at this temperature (the density of liquid acetone at 35° C. is 0.773 g/cm³), $V_C$ is the pore volume (cm³/g) of the pores below the critical pore size that can be filled with adsorption, $D_A$ is the average pore size (nm) of the pores with filling adsorption calculated by the formula $D_A = 4V_C/(S-S_C)$, b is the adsorption capacity of acetone on the unit specific surface area and is the covering adsorption coefficient (g/m²), $S_C$ is the specific surface area (m²/g) of covered adsorption above the critical pore size, S is the total area (m²/g), P is any pressure point (mbar) on the adsorption isotherm, $D_C$ is the critical pore size (nm) below which the filling adsorption can occur at pressure P, the one-to-one correspondence between P and $D_C$ can be solved by using the equation $D_C = 0.0103 \times P + 2.4$, combined with the pore structure parameters of the adsorption materials, the critical pore volume $V_C$ and the critical specific surface area $S_C$ at the critical pore size De corresponding to any pressure P are calculated respectively.

Figure 11:
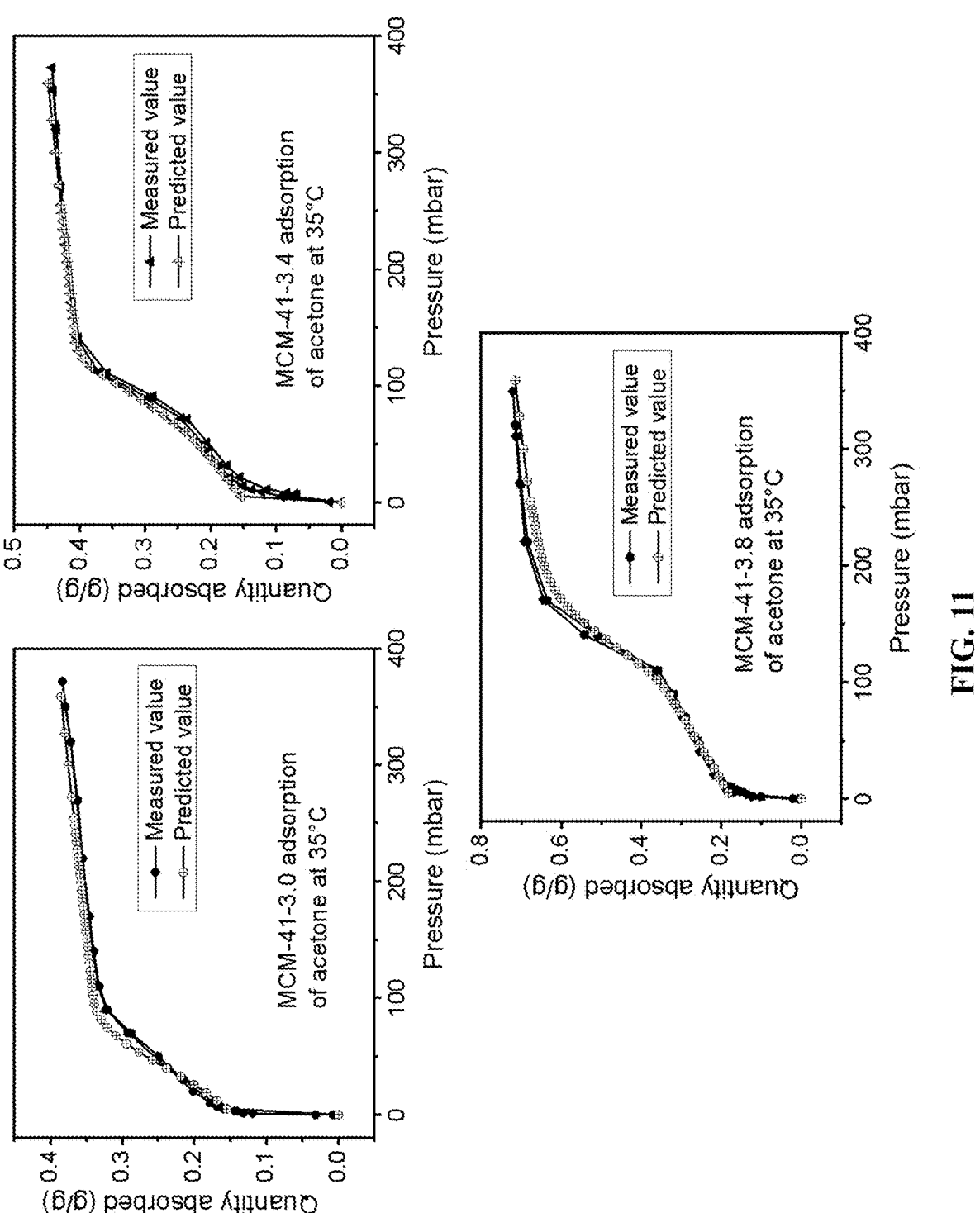
FIG. 11 is a comparison between the measured and predicted adsorption isotherms of embodiment 4.

The value of each pressure point (P) on the adsorption isotherm and its corresponding pore structure parameters ($V_C$, $S_C$, S) are brought into the adsorption capacity prediction equation, the adsorption capacity of acetone on the adsorption materials with the change of pressure at 35° C. is calculated, and the predicted adsorption isotherm is obtained. FIG. 11 shows the predicted adsorption isotherms of adsorption materials with different pore sizes and the measured adsorption isotherms. It can be seen from FIG. 11 that the prediction method provided by the invention can well coincide with the adsorption isotherms obtained by experimental tests.

It can be found that the method of the invention is also applicable to the derivation and prediction of the adsorption capacity and adsorption isotherm prediction equation of other VOCs (such as acetone) at other temperatures (such as 35° C.). In general, the basic structure of the adsorption capacity prediction equation $Q = a \times \rho \times V_C + b \times S_C$ remains unchanged, that is, the adsorption of VOCs by porous materials includes two parts: filling adsorption and covering adsorption, the coefficients of the two adsorption modes are calibrated by introducing the effects of pressure changes and pore size differences. Since the adsorption temperature has an important influence on the adsorption process of VOCs, and the saturated vapor pressure, molecular weight, molecular size, boiling point, polarity and other properties of different VOCs are different, therefore, the coefficients (a and b) corresponding to the filling adsorption and the covering adsorption will also be different, the effects of pressure change and pore size on the two adsorption methods are also different. However, in general, according to the adsorption isotherm of the model adsorption materials for a specific VOCs and the pore structure parameters of the adsorption materials, the prediction equation of the adsorption capacity of the specific VOCs at a specific adsorption temperature can be derived, indicating that the VOCs adsorption capacity and adsorption isotherm prediction method of the invention have good extensibility.

Embodiment 5

In order to further verify that the obtained adsorption prediction equation can be applied to the prediction of adsorption capacity and adsorption isotherm of other conventional adsorption materials for specific VOCs at a specific temperature, in this embodiment, the porous silica material without concentrated pore size distribution is used as the adsorption materials. The prediction equation of benzene adsorption capacity at 25° C. obtained by embodiment 2 is used to verify the applicability of the equation to other adsorption materials with non-concentrated pore size distribution.

In embodiment 2, the adsorption capacity prediction equation of benzene at 25° C.:

$$Q = (0.77 + 0.08 \times (D_A - 1.85) + 0.001 \times P) \times 0.874 \times V_C +$$
$$(0.00005 + 0.000015 \times P) \times S_C$$

Wherein, Q is the adsorption of benzene per unit mass of adsorption materials at pressure P(g/g), ρ is the density of liquid VOCs at this temperature (the density of liquid benzene at 25° C. is 0.874 g/cm³), $V_C$ is the pore volume (cm³/g) of the pores below the critical pore size that can undergo filling adsorption, $D_A$ is the average pore size (nm) of the pores with filing adsorption, $S_C$ is the specific surface area (m²/g) of covering adsorption above the critical pore size, P is any pressure point (mbar) on the adsorption isotherm, and $D_C$ is the critical pore size (nm) below which the filling adsorption can occur at a specific pressure P.

Figure 12:
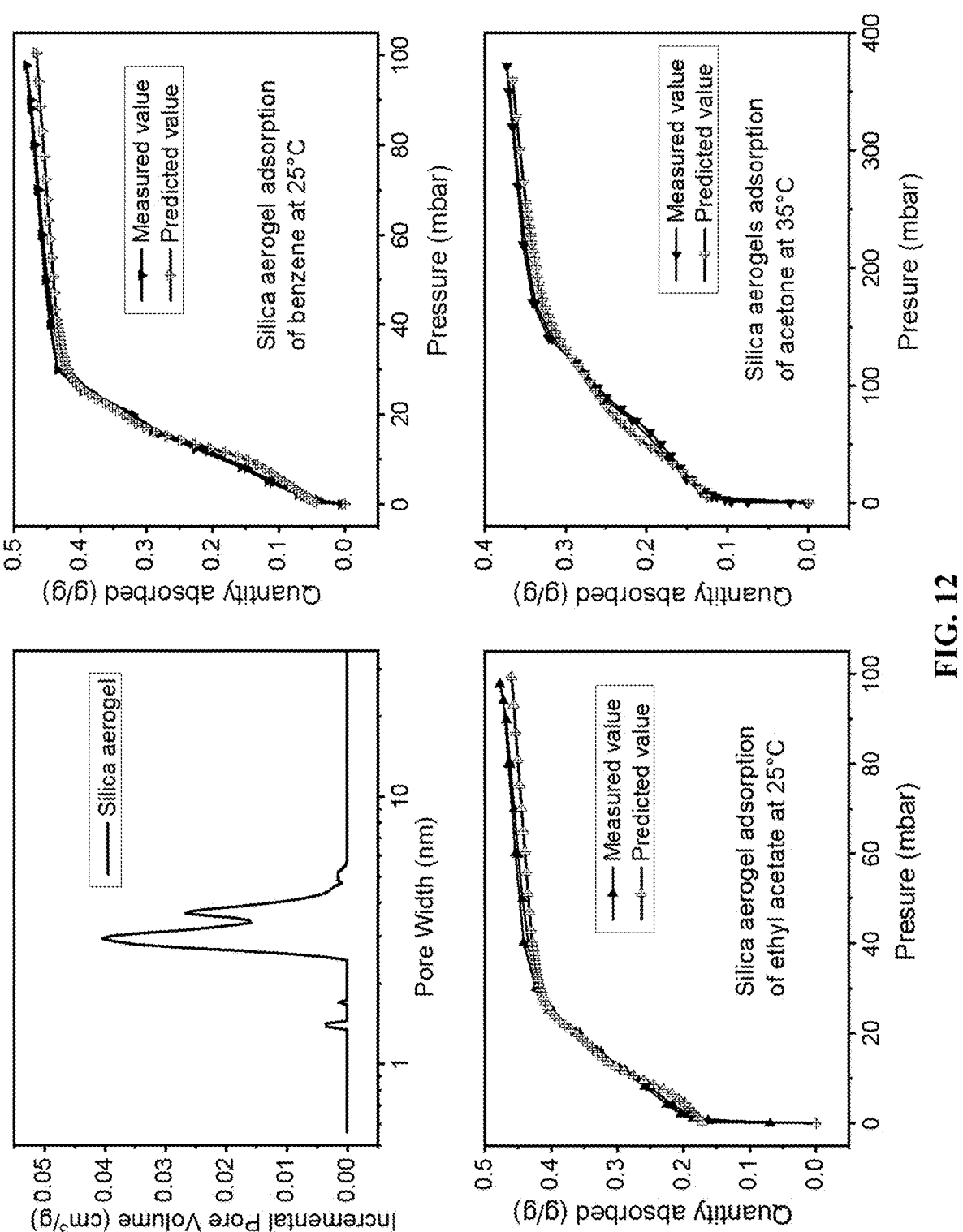
FIG. 12 is a pore size distribution and a comparison between the measured and predicted adsorption isotherms of embodiment 5.

The adsorption capacity of benzene on porous silica adsorption materials at 25° C. is calculated by using the calibrated adsorption capacity prediction equation in embodiment 2, and the predicted adsorption isotherm is obtained. In addition, the adsorption isotherms of ethyl acetate at 25° C. and acetone at 35° C. on porous silica were calculated using the adsorption capacity prediction equations in embodiment 3 and embodiment 4, respectively. FIG. 12 shows the comparison between the predicted adsorption isotherms and the measured adsorption isotherms of porous silica adsorbent materials without concentrated pore size distribution. It can be seen from FIG. 12 that the prediction method provided by the invention can well coincide with the adsorption isotherm obtained by the experimental test.

It can be found that the method of this invention is also applicable to the prediction of the adsorption capacity and adsorption isotherm of specific VOCs by other adsorption materials without concentrated pore size distribution at a specific temperature. The adsorption capacity prediction equation obtained by using the silicon-based adsorption materials in embodiment 2 can be directly used to predict the adsorption capacity of other silicon-based adsorption materials (such as porous silicon oxide) without concentrated pore size distribution. Therefore, when the composition and surface properties of the material are similar, the adsorption capacity prediction equation obtained under the same test conditions can be directly used to predict the adsorption capacity and adsorption isotherm of other adsorption materials. It shows that the VOCs adsorption capacity and adsorption isotherm prediction method of the invention have good extensibility.

Embodiment 6

In order to further verify that the adsorption prediction equation can be applied to the adsorption of VOCs by other adsorption materials with different surface properties at a specific temperature. In this embodiment, coconut shell activated carbon and activated carbon fiber are used as adsorption materials, based on the prediction equation of adsorption capacity of benzene at 25° C. obtained from embodiment 2, the coefficient a is adjusted by combining the difference between the surface properties and the interaction strength of VOCs, which is used to predict the adsorption amount of VOCs on carbon-based adsorption materials, and the scalability of the equation for predicting the adsorption amount of adsorption materials with different surface properties is verified.

Since the surface of the carbon material has a rich π-conjugated structure, it can undergo π-π conjugation with benzene molecules. The adsorption of benzene molecules on carbon materials can be fully rearranged, as a result, more benzene can be adsorbed in unit volume, so $a_0$ in the filling adsorption coefficient a of the carbon-based adsorption materials increases compared with the silicon-based adsorption materials. The predicted adsorption isotherm on carbon material before calibration is obtained by using the prediction equation of benzene adsorption on silicon-based adsorbent at 25° C. in embodiment 2, by comparing it with the measured adsorption isotherms on carbon materials, it can be calculated that $a_0$ changes from 0.77 to 0.95, and the prediction equation of benzene adsorption on carbon materials at 25° C. is obtained:

$$Q = (0.95 + 0.08 \times (D_A - 1.85) + 0.001 \times P) \times 0.874 \times V_C +$$
$$(0.00005 + 0.000015 \times P) \times S_C$$

Wherein, Q is the adsorption capacity of benzene per unit mass of adsorption materials at pressure P (g/g), $\rho$ is the density of liquid VOCs at this temperature (the density of liquid benzene at 25° C. is 0.874 g/cm³), $V_C$ is the pore volume (cm³/g) of the pores below the critical pore size that can be filled with adsorption, $D_A$ is the average pore size (nm) of the pores with filling adsorption, $S_C$ is the specific surface area (m²/g) of covered adsorption above the critical pore size, P is any pressure point (mbar) on the adsorption isotherm, and $D_C$ is the critical pore size (nm) below which the filling adsorption can occur at a specific pressure P.

Figure 13:
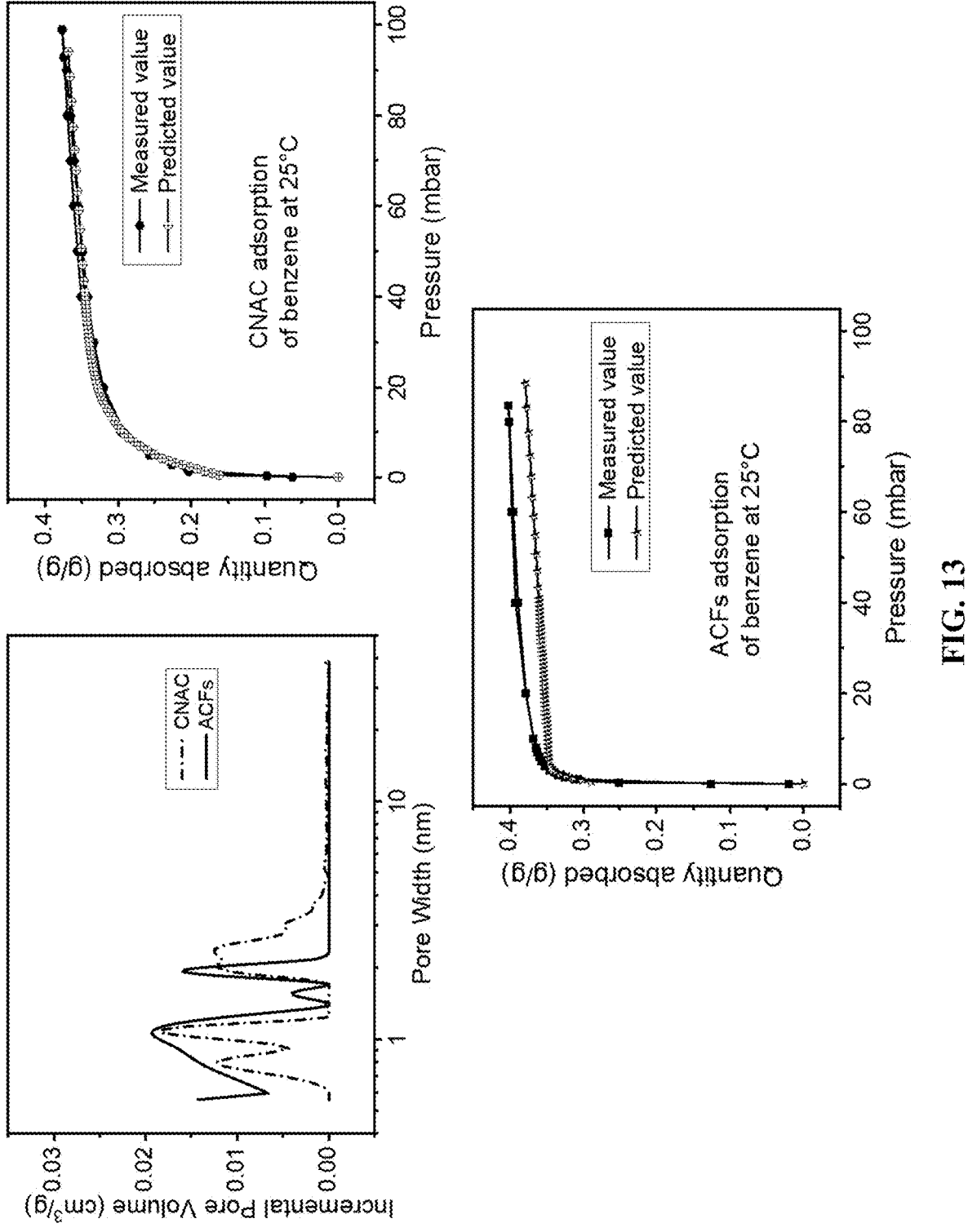
FIG. 13 is a pore size distribution and a comparison between the measured and predicted adsorption isotherms of embodiment 6.

On the basis of the adsorption prediction equation obtained by the silicon-based adsorption materials in embodiment 2, the difference in the interaction between the carbon-based adsorption materials and the benzene is added to adjust the $a_0$ in the filling adsorption coefficient a, and the adsorption capacity prediction equation suitable for the adsorption of benzene by the carbon material is obtained. The equation is used to calculate the adsorption capacity of benzene on coconut shell activated carbon and activated carbon fiber with pressure at 25° C., and the predicted adsorption isotherm is obtained. FIG. 13 shows the predicted and measured adsorption isotherms of coconut shell activated carbon and activated carbon fiber adsorption materials. It can be seen from FIG. 13 that the adsorption isotherm obtained by the prediction method provided by the invention can well coincide with the measured adsorption isotherm of the experimental test.

It can be found that the method of this invention can extend the prediction equation of VOCs adsorption capacity to other adsorption materials with different compositions and surface properties by introducing the difference between the surface properties of adsorption materials and the interaction relationship of VOCs molecules. In general, the basic structure of the adsorption prediction equation $Q=a\times\rho\times V_C+b\times S_C$ remains unchanged, that is, the adsorption of VOCs by porous materials includes two parts: filling adsorption and covering adsorption, and the coefficients of the two adsorption modes are calibrated by introducing the effects of pressure and pore size. Due to the different interaction forces between the surface properties of different types of adsorption materials and specific types of VOCs, there will be some differences in the filling adsorption coefficient a in the adsorption capacity prediction equation, by comparing the predicted and measured adsorption isotherms, the coefficient a can be adjusted, and then the adsorption capacity prediction equation of other adsorption materials for specific VOCs can be extended. On the basis of the adsorption prediction equation of VOCs derived from the model adsorption materials, the adsorption prediction equation of the specific VOCs on other types of adsorption materials can be further obtained, indicating that the VOCs adsorption capacity and adsorption isotherm prediction method of the invention have good scalability.

In summary, based on the theoretical basis that the adsorption of VOCs by porous materials includes two parts: filling adsorption and covering adsorption, according to the adsorption capacity of filling adsorption is related to the density and the pore volume of filling adsorption, while the adsorption capacity of covering adsorption is related to the specific surface area of covering adsorption, the basic structure of the adsorption prediction equation $Q=a\times\rho\times V_C+b\times S_C$ is obtained, the coefficients of the two adsorption types are calibrated by introducing the influence of pressure and pore size, and the calibrated adsorption capacity and adsorption isotherm prediction equation are obtained. The equation can be used to predict the adsorption capacity and adsorption isotherm of VOCs with model adsorption materials with concentrated pore size distribution and conventional adsorption materials without concentrated pore size distribution under the same or similar adsorption conditions. Combined with the difference in the surface interaction between specific VOCs and different adsorption materials, the method of this invention can be used for the derivation and adjustment of the prediction equation of the adsorption capacity of specific VOCs for other different types of adsorption materials with different surface properties, so as to realize the prediction of the adsorption capacity and adsorption isotherm of specific VOCs by the corresponding adsorption materials under specific adsorption conditions. It shows that the VOCs adsorption capacity and adsorption isotherm prediction method of the invention have good extensibility.

The above are only the preferred implementation methods of the invention, it should be pointed out that for the ordinary technical personnel in the technical field, some improvements and embellishments can be made without breaking away from the principle of the invention, these improvements and embellishments should also be regarded as the protection scope of the invention.

What is claimed is:

1. A method for volatile organic compounds adsorption capacity prediction based on filling adsorption, comprising the following steps:

(1) providing two or more porous materials with concentrated pore size distribution as model adsorption materials;

(2) testing pore structure parameters, testing adsorption isotherms of the model adsorption materials for specific VOCs at specific adsorption temperatures, and obtaining an adsorption capacity Q of the model adsorption materials under different pressures; the pore structure parameter comprises a pore size distribution, a pore volume in a specific pore size range, and a specific surface area in a specific pore size range;

(3) obtaining a corresponding pressure interval when the filling adsorption occurs in each of the model adsorption materials according to the adsorption isotherms, taking an intermediate value of the pressure interval as a critical pressure point $P_C$, making a critical pressure point $P_C$ correspond to the intermediate value of the pore size distribution of the adsorbent material, taking the intermediate value of the pore size distribution as the critical pore size $D_C$ at which filling adsorption can occur at the critical pressure point $P_C$;

(4) taking the critical pore size $D_C$ as a demarcation point, obtaining a pore volume $V_C$ of the pores below the critical pore size $D_C$ and a specific surface area of the pore $S_C$ above the critical pore size $D_C$, respectively, according to the pore structure test results of the adsorption materials;

(5) the adsorption capacity Q, pore volume $V_C$ and specific surface area $S_C$ meet the prediction equation $Q=f(V_C, S_C)$ of volatile organic compounds adsorption capacity based on filling adsorption, i.e. formula 1:

$$Q = f(Vc, Sc) = a \times \rho \times Vc + b \times Sc, \text{ i.e.;} \qquad \text{(formula 1)}$$

wherein, Q is the adsorption capacity of VOCs by adsorption materials per unit mass, g/g;

a is the coefficient of filling adsorption, no unit;

$\rho$ is the density of liquid VOCs at specific adsorption temperature, g/cm$^3$;

$V_C$ is the pore volume of the pores below the critical pore size $D_C$, cm$^3$/g;

b is the adsorption amount of VOCs per unit specific surface area through covering adsorption, g/m$^2$;

$S_C$ is the specific surface area of the pores above the critical pore size $D_C$, m$^2$/g;

(6) testing the other adsorption materials at the same adsorption temperature, according to the steps (2)~(4), obtaining the adsorption capacity Q, pore volume $V_C$ and specific surface area $S_C$ of the remaining adsorption materials, introducing these data into formula 1 to obtain the specific values of coefficients a and b, and obtain the prediction equation of adsorption capacity of volatile organic compounds based on filling adsorption.

2. The method according to claim 1, wherein step (2) also comprises: performing a test using a commercial specific surface area and pore structure analyzer, obtaining the pore structure parameters of the adsorption materials through the calculation model of DFT cylindrical pore.

3. The method according to claim 1, wherein obtaining a linear relationship between the pressure point $P_C$ and the critical pore size $D_C$ according to the pressure points and the corresponding critical pore size $D_C$ of the two or more adsorption materials with concentrated pore size distribution, i.e. formula 2:

$$D_C = k \times P_C + D_0; \qquad \text{(formula 2)}$$

wherein, $D_C$ is the critical pore size below which filling adsorption can occur at the pressure point $P_C$, nm;

k is the slope of the linear relationship between the critical pore size and the pressure, nm/mbar;

$D_0$ is the value of $D_C$ in the linear relationship when the pressure approaches 0, nm according to formula 2, combined with the pore structure parameters of the adsorption materials, calculating the pore volume $V_C$, which is below the corresponding critical pore size $D_C$, and specific surface area $S_C$, which is above the corresponding critical pore size, for any critical pore size $D_C$, respectively.

4. The method according to claim 1, wherein it also includes the difference in pore size of different model adsorption materials and the change of pressure are introduced into the prediction equation of volatile organic compounds adsorption capacity based on filling adsorption for calibration, obtaining the calibrated equation for VOCs adsorption capacity prediction at different pressures, i.e. formula 3;

$$Q = f(D_A, P) \times \rho \times Vc + g(P) \times Sc; \qquad \text{(formula 3)}$$

wherein, Q is the adsorption capacity of VOCs per unit mass of adsorption materials, g/g;

$D_A$ is the average pore size of pores in which filling adsorption occurred, nm; wherein, $D_A=4V_C/(S-S_C)$, S is the total specific surface area, m$^2$/g;

$f(D_A,P)$ indicates that the coefficient a of the filling adsorption is a function of the pore size $D_A$ and the pressure P;

$\rho$ is the density of liquid VOCs at specific adsorption temperature, g/cm$^3$;

$V_C$ is the pore volume of the pores below the critical pore size $D_C$, cm$^3$/g;

$g(P)$ indicates that the coefficient b of covering adsorption is a function of pressure P;

$S_C$ is the specific surface area of the pores above the critical pore size, m$^2$/g.

5. The method according to claim 4, wherein $f(D_A, P)$ satisfies formula 4:

$$f(D_A, P) = (a_0 + a_1 \times (D_A - D_0) + a_2 \times P); \qquad \text{(formula 4)}$$

wherein, $a_0$ is the part of coefficient a that is not affected by pore size and pressure change, no unit;

$a_1$ is the part of coefficient a that is affected by the difference of pore size, nm$^{-1}$;

$a_2$ is the part of coefficient a that is affected by pressure change, mbar$^{-1}$;

$D_0$ is the value of $D_C$ when the pressure approaches 0 in the linear relationship between the critical pore size and the critical pressure, nm;

$g(P)$ satisfies formula 5:

$$g(P) = (b_0 + b_2 \times P); \qquad \text{(formula 5)}$$

wherein, $b_0$ is the part of coefficient b that is not affected by pore size and pressure change, g/m$^2$;

$b_2$ is the part of coefficient b that is affected by the pressure change, g/m$^2$/mbar.

6. The method according to claim 1, wherein the model adsorption materials are one or more of ordered mesoporous silica, ordered mesoporous carbon and molecular sieves.

7. The method according to claim 1, wherein the VOCs are one of hydrocarbon organics, oxygen-containing organics, halogen-containing organics, nitrogen-containing organics and sulfur-containing organic.

8. The method according to claim 4, wherein the model adsorption materials are one or more of ordered mesoporous silica, ordered mesoporous carbon and molecular sieves.

9. The method according to claim 4, wherein the VOCs are one of hydrocarbon organics, oxygen-containing organics, halogen-containing organics, nitrogen-containing organics and sulfur-containing organic.

* * * * *